US012625860B2

(12) United States Patent
Heine

(10) Patent No.: US 12,625,860 B2
(45) Date of Patent: May 12, 2026

(54) DATA MANAGEMENT SYSTEM FOR UI TRANSACTIONS

(71) Applicant: Bank of America Corporation, Charlotte, NC (US)

(72) Inventor: Suzan Heine, Flowery Branch, GA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/884,749

(22) Filed: Sep. 13, 2024

(65) Prior Publication Data

US 2026/0079910 A1     Mar. 19, 2026

(51) Int. Cl.
  *G06F 16/23*      (2019.01)
  *G06F 16/22*      (2019.01)

(52) U.S. Cl.
  CPC ...... *G06F 16/2365* (2019.01); *G06F 16/2246* (2019.01); *G06F 16/2386* (2019.01)

(58) Field of Classification Search
  CPC ............. G06F 16/2365; G06F 16/2386; G06F 16/2246
  See application file for complete search history.

(56) References Cited

U.S. PATENT DOCUMENTS 6,473,794 B1   10/2002  Guheen et al.
6,519,571 B1    2/2003  Guheen et al.

6,536,037 B1    3/2003  Guheen et al.
6,601,233 B1    7/2003  Underwood
6,609,128 B1    8/2003  Underwood
6,615,166 B1    9/2003  Guheen et al.
6,633,878 B1   10/2003  Underwood
6,704,873 B1    3/2004  Underwood (Continued)

FOREIGN PATENT DOCUMENTS

WO     2000073929 A2    12/2000
WO     2000073930 A2    12/2000

(Continued)

*Primary Examiner* — Jensen Hu
(74) *Attorney, Agent, or Firm* — Banner & Witcoff, Ltd.

(57)          ABSTRACT

Comprehensive systems and methods manage software life-cycle processes in an enterprise environment, and ensures consistent, secure, and efficient handling of software applications, packages, and distribution methods. The system features a web application interface that validates user input, enforces multi-level authentication, and manages user roles and permissions. A directory system dynamically selects stored procedures based on input data and current database structure, executing operations entirely within the database. Stored procedures enforce business logic, manage complex data relationships, support data encryption, and anonymize sensitive information. Hierarchical data structures organize records with multi-level granularity, temporal tracking, and partitioning. The database management system optimizes operations, implements automatic failover, and supports real-time data synchronization. The system also includes advanced error handling, real-time monitoring with predictive alerts, a secure audit trail, and a reporting module integrating with external business intelligence tools. Automated maintenance and disaster recovery ensure scalable, secure software lifecycle management.

19 Claims, 6 Drawing Sheets

System Architecture Diagram

(56)                 References Cited

U.S. PATENT DOCUMENTS

| | | | | |
|---|---|---|---|---|
| 6,715,145 | B1 * | 3/2004 | Bowman-Amuah | ..... G06F 8/20 |
| | | | | 718/100 |
| 6,718,535 | B1 | 4/2004 | Underwood | |
| 7,100,195 | B1 | 8/2006 | Underwood | |
| 7,149,698 | B2 | 12/2006 | Guheen et al. | |
| 7,165,041 | B1 | 1/2007 | Guheen et al. | |
| 7,194,538 | B1 * | 3/2007 | Rabe | ........................ H04L 67/75 |
| | | | | 709/224 |
| 7,315,826 | B1 | 1/2008 | Guheen et al. | |
| 8,121,874 | B1 | 2/2012 | Guheen et al. | |
| 2002/0016814 | A1 | 2/2002 | Convent et al. | |
| 2007/0192254 | A1 * | 8/2007 | Hinkle | ................... G06Q 40/04 |
| | | | | 705/51 |
| 2008/0052541 | A1 * | 2/2008 | Ginter | .................... G06F 21/51 |
| | | | | 713/193 |

FOREIGN PATENT DOCUMENTS

| | | | |
|---|---|---|---|
| WO | 2000073955 | A2 | 12/2000 |
| WO | 2000073957 | A2 | 12/2000 |
| WO | 2000073958 | A2 | 12/2000 |

\* cited by examiner

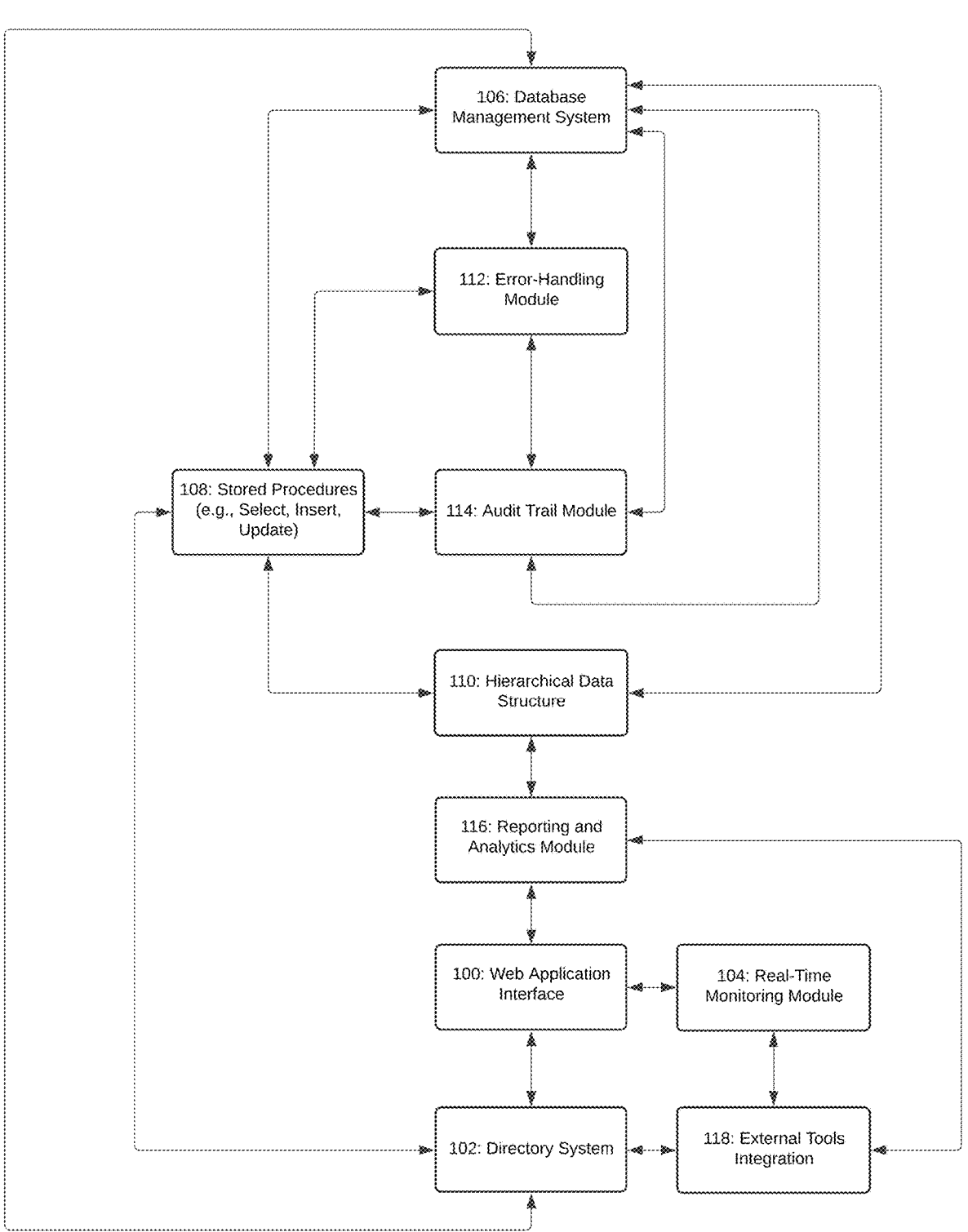
FIG. 1: System Architecture Diagram

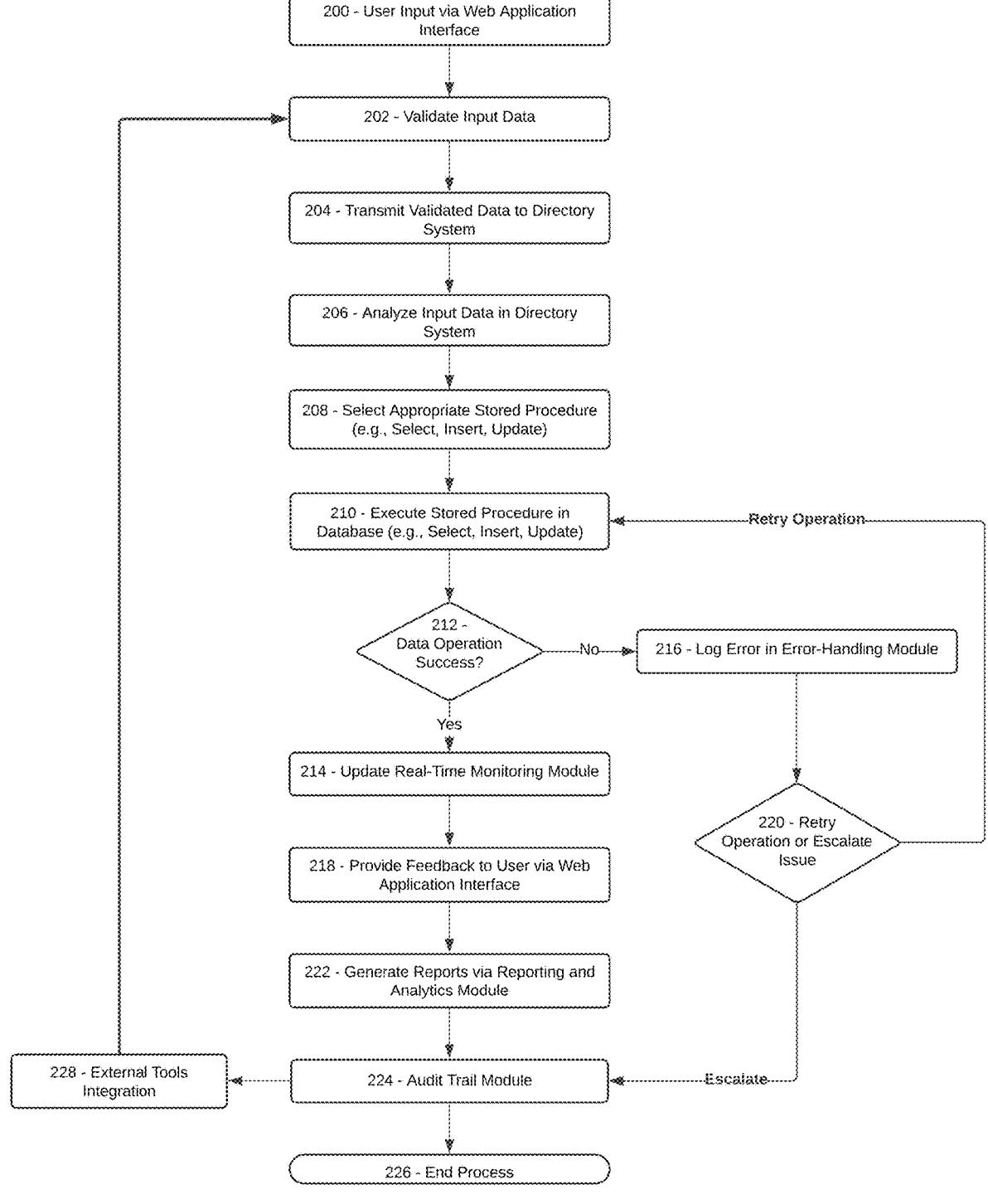
FIG. 2: Process Flow Diagram

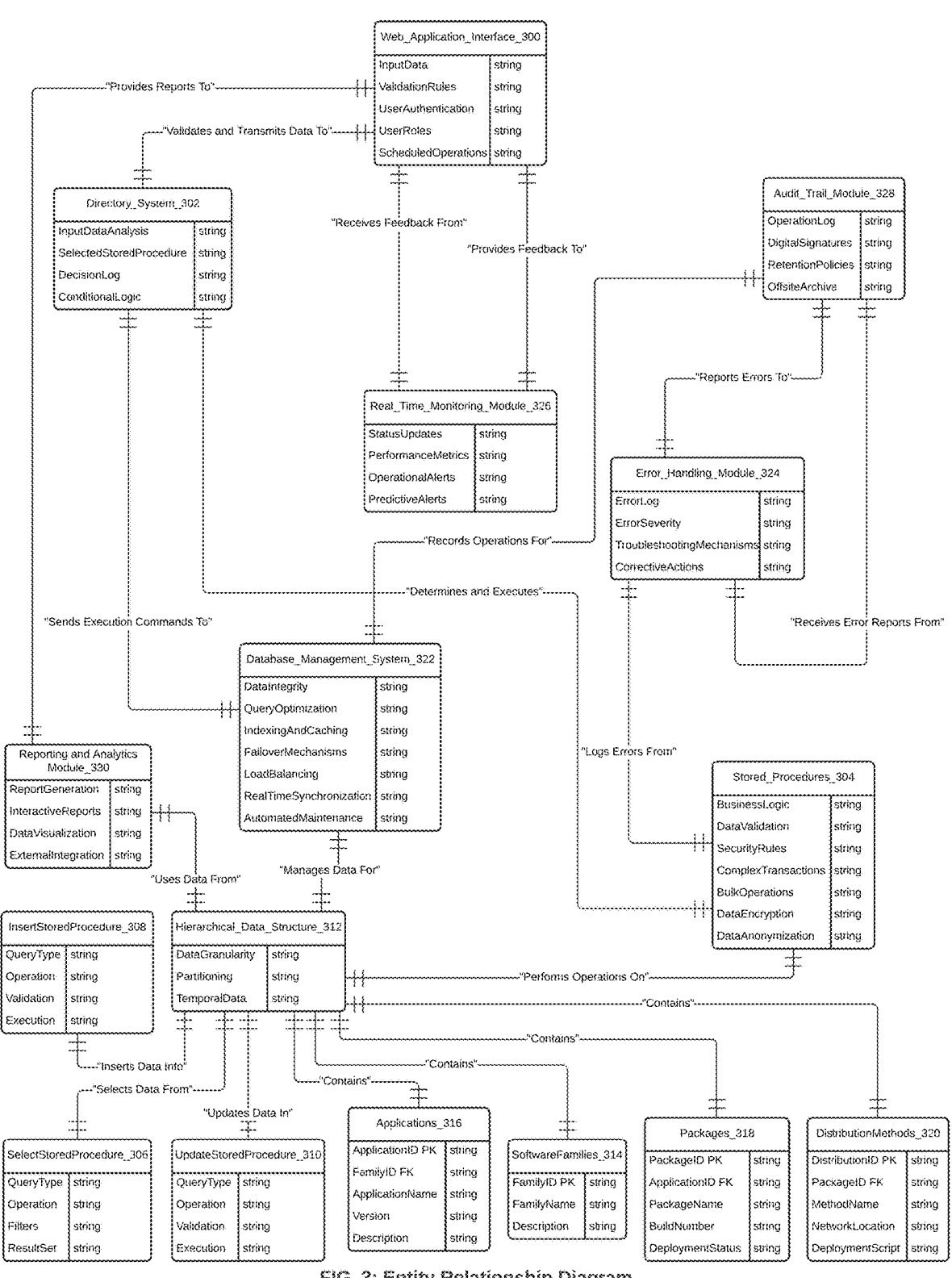
FIG. 3: Entity Relationship Diagram

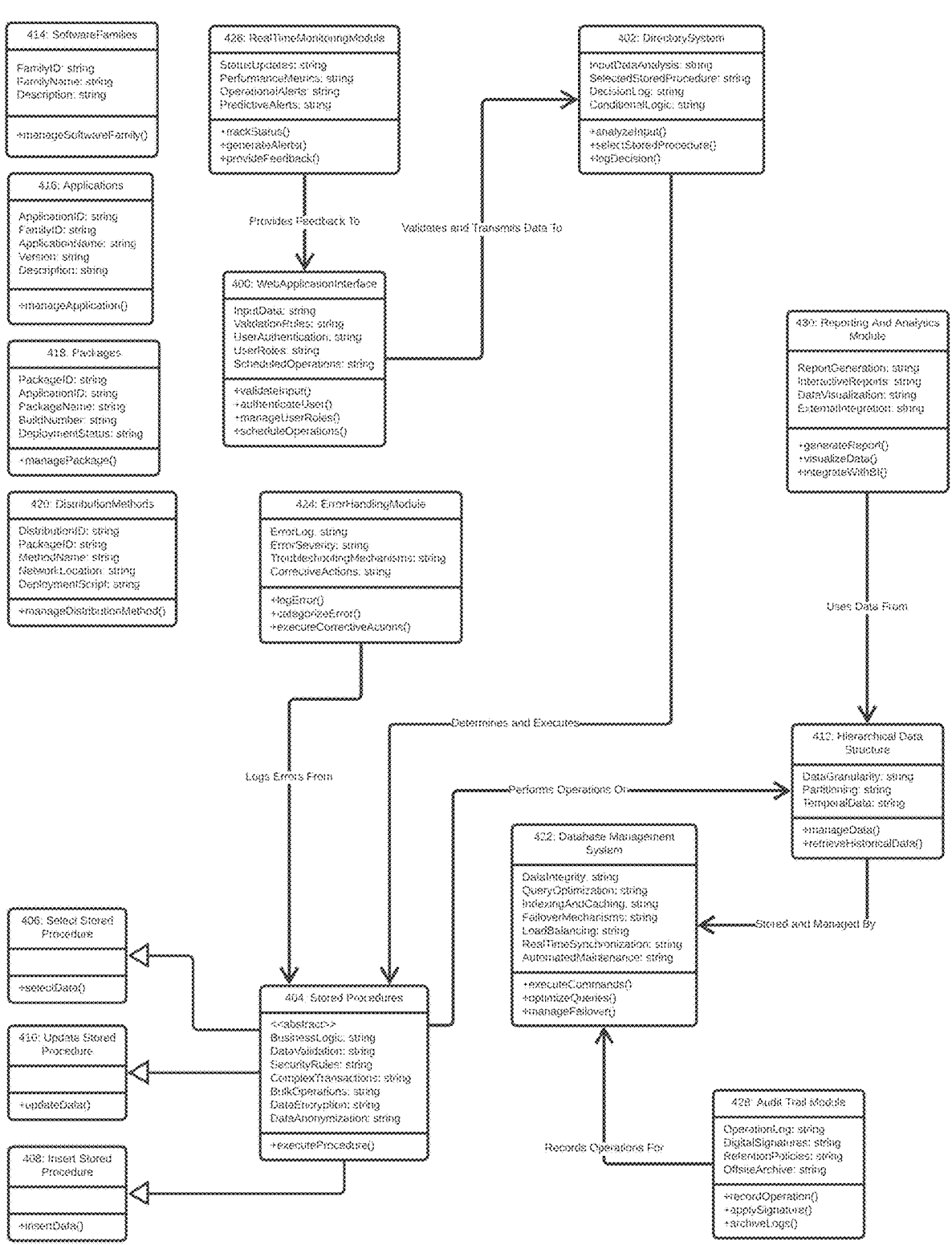
FIG. 4: Class Diagram

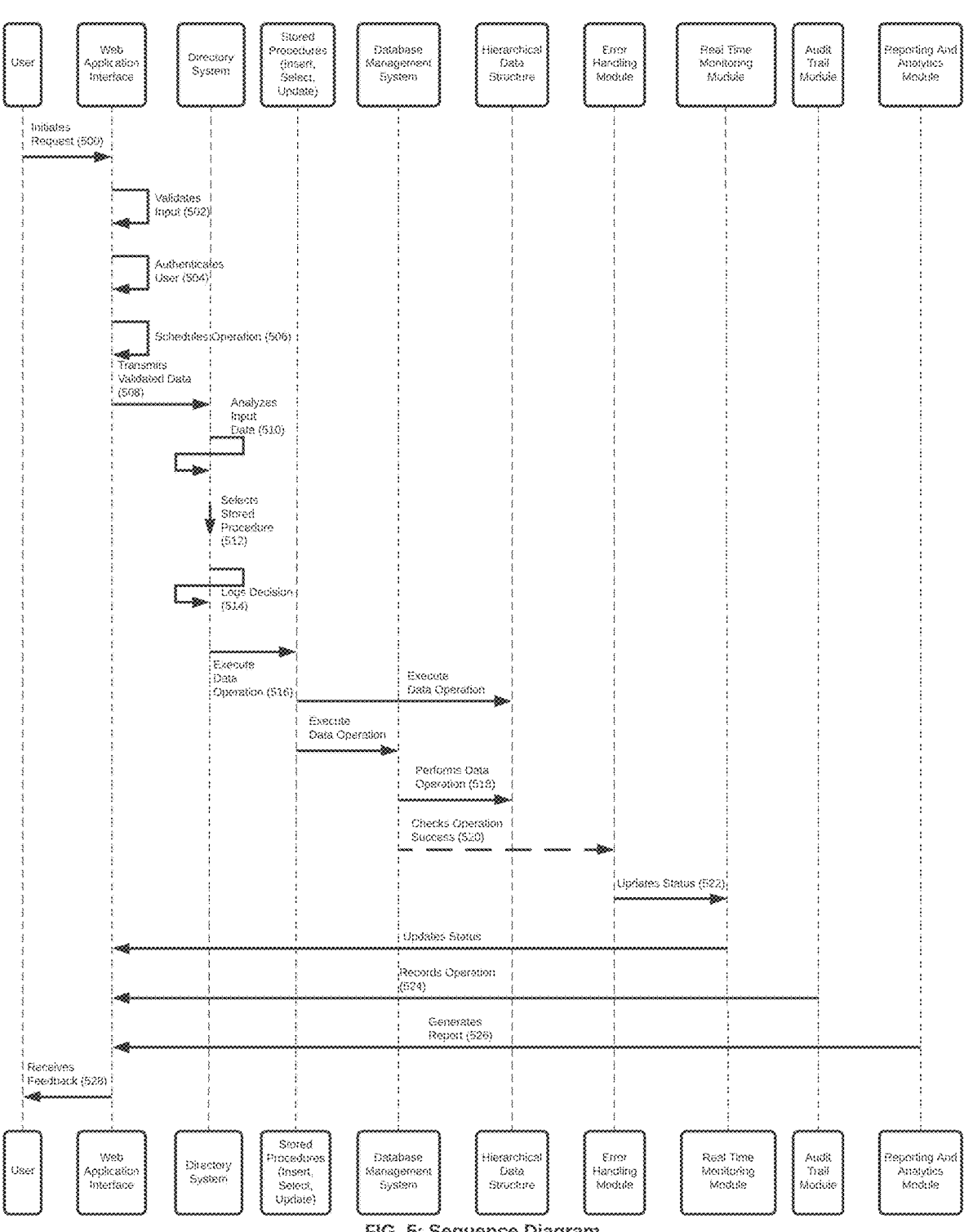
FIG. 5: Sequence Diagram

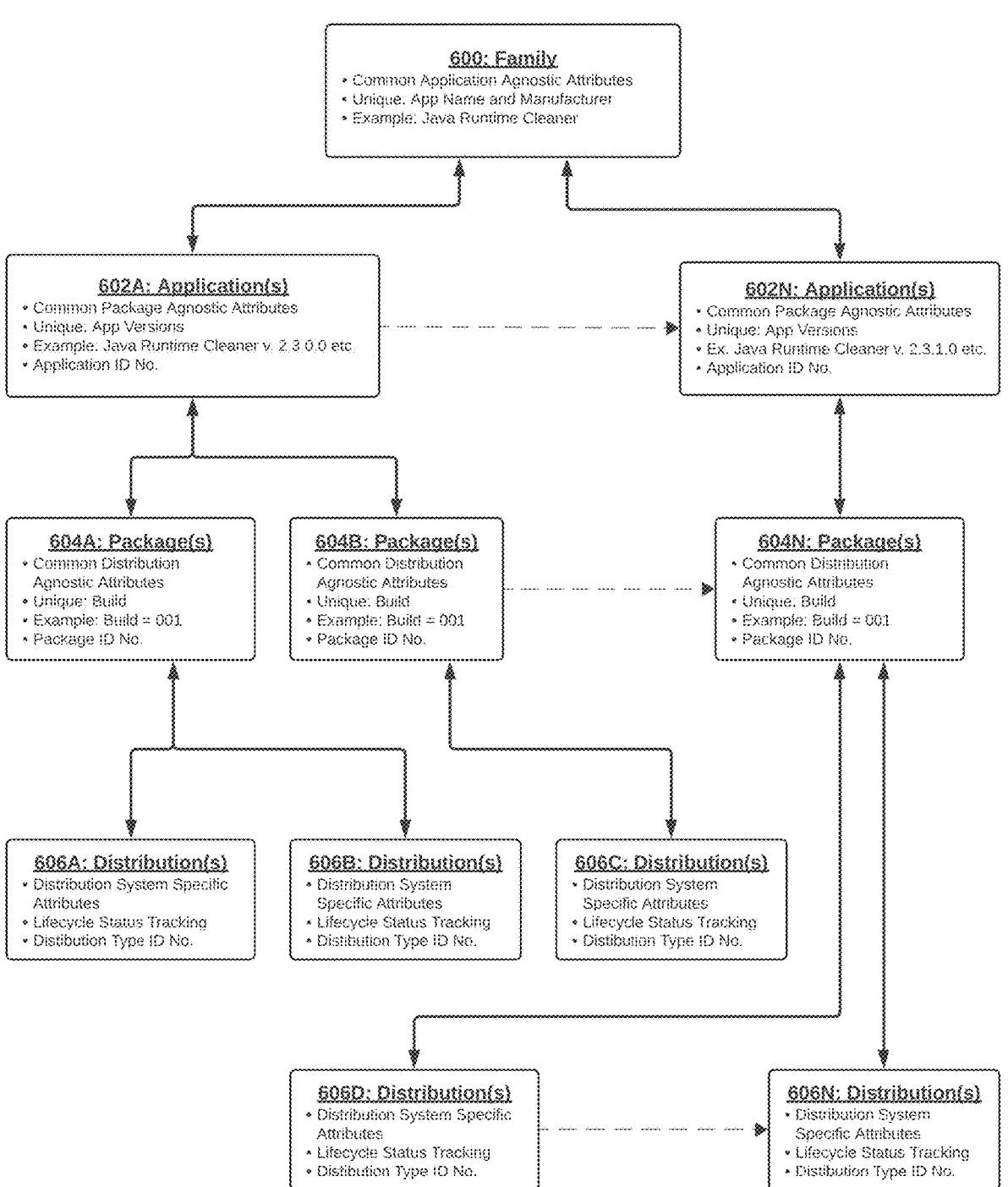

600: Family
* Common Application Agnostic Attributes
* Unique: App Name and Manufacturer
* Example: Java Runtime Cleaner

602A: Application(s)
* Common Package Agnostic Attributes
* Unique: App Versions
* Example: Java Runtime Cleaner v. 2.3.0.0 etc.
* Application ID No.

602N: Application(s)
* Common Package Agnostic Attributes
* Unique: App Versions
* Ex. Java Runtime Cleaner v. 2.3.1.0 etc.
* Application ID No.

604A: Package(s)
* Common Distribution Agnostic Attributes
* Unique: Build
* Example: Build = 001
* Package ID No.

604B: Package(s)
* Common Distribution Agnostic Attributes
* Unique: Build
* Example: Build = 001
* Package ID No.

604N: Package(s)
* Common Distribution Agnostic Attributes
* Unique: Build
* Example: Build = 001
* Package ID No.

606A: Distribution(s)
* Distribution System Specific Attributes
* Lifecycle Status Tracking
* Distibution Type ID No.

606B: Distribution(s)
* Distribution System Specific Attributes
* Lifecycle Status Tracking
* Distibution Type ID No.

606C: Distribution(s)
* Distribution System Specific Attributes
* Lifecycle Status Tracking
* Distibution Type ID No.

606D: Distribution(s)
* Distribution System Specific Attributes
* Lifecycle Status Tracking
* Distibution Type ID No.

606N: Distribution(s)
* Distribution System Specific Attributes
* Lifecycle Status Tracking
* Distibution Type ID No.

FIG. 6: Sample Recored Hierarchy Diagram

1

DATA MANAGEMENT SYSTEM FOR UI TRANSACTIONS

TECHNICAL FIELD

The inventions disclosed herein pertain to the field of Data Processing-Software Development, Installation, and Management, which encompasses the disclosed inventions herein that facilitate the development, installation, maintenance, and management of software systems. The disclosed inventions are pertinent to this field as they provide comprehensive systems and methods for managing software lifecycle processes, including the development and deployment of software families, applications, packages, and distributions. The inventions ensure that software is managed consistently and securely from development through deployment, using automated tools and processes that streamline software lifecycle management in enterprise environments.

DESCRIPTION OF THE RELATED ART

In enterprise software systems, managing and maintaining data consistency across different layers of the application architecture is a significant challenge that has persisted for decades. This challenge is particularly pronounced in systems where the responsibilities for web development and database management are divided among separate teams, each with its own specialized tools, languages, and methodologies. The web development team typically focuses on creating user interfaces and handling client-side logic, while the database management team is responsible for the backend processes, including data storage, retrieval, and manipulation. This division of labor, while necessary in large-scale systems, often leads to a fragmentation of business logic, where different parts of the system enforce different rules or handle data in slightly different ways. This fragmentation can result in a variety of issues that compromise the reliability, efficiency, and security of the system.

One of the most common problems caused by this fragmentation is the duplication of business logic across the web and database layers. For example, a business rule that governs how data should be validated—such as ensuring that a user's input falls within a certain range or adheres to a specific format—might be implemented in both the web code and the database code. The web code might enforce this rule to provide immediate feedback to users when they interact with the application, while the database code enforces the same rule to ensure that all data stored in the system meets the required standards. However, because these implementations are done by different teams using different tools and languages, they are not always kept in sync. When a change is made to the business rule, it might be updated in the web code but not in the database code, or vice versa. This lack of synchronization can lead to situations where data that is considered valid by the web layer is rejected by the database layer, or where invalid data is inadvertently stored because the database logic was not updated. The resulting inconsistencies can cause significant issues in the system, ranging from minor annoyances for users to critical data integrity problems.

Another major issue arising from the separation of web and database development is the difficulty of maintaining synchronization between the two layers. As web applications evolve, they often require changes to both the user interface and the underlying database. For instance, adding a new feature to the application might necessitate the creation of new database tables or the modification of existing ones. However, these changes are not always communicated effectively between the web and database teams. This can lead to situations where the web code expects certain data structures or behaviors from the database that are not actually present, resulting in runtime errors or unexpected behavior. These synchronization issues can be particularly problematic in systems that rely on complex data interactions, where even small discrepancies between the web and database layers can have cascading effects that disrupt the entire application.

The debugging and troubleshooting of issues that arise from such inconsistencies can be extremely challenging and time-consuming. When a problem occurs in a system where business logic is fragmented across multiple layers, it is often difficult to determine where the issue lies. The problem could be in the web code, the database code, or in the interaction between the two. This ambiguity forces developers to spend significant amounts of time investigating both layers, trying to trace the flow of data and identify where the breakdown occurred. The lack of a centralized source of business logic exacerbates this difficulty, as there is no single point of reference that developers can consult to understand how data is supposed to be processed. Instead, they must piece together information from various parts of the system, each of which might be implemented differently depending on the team that worked on it. This not only delays the resolution of issues but also increases the likelihood that similar problems will recur in the future, as the root cause may not be fully understood or addressed.

In addition to these challenges, the fragmentation of business logic across the web and database layers can lead to significant performance discrepancies. The way data is handled in the web code versus the database code can have a major impact on the overall performance of the system. For example, if complex data processing tasks are implemented in the web code, they may not be optimized for handling large data sets or high volumes of transactions. This can lead to slower performance, particularly in client-side applications, where processing power and memory are limited. Conversely, if too much logic is placed on the database side without considering the interaction patterns of the web application, it could overload the database, causing slowdowns and bottlenecks that affect the entire system. Balancing the distribution of logic between the web and database layers is a delicate task that is often mishandled due to the lack of a unified system. This can result in a system that is either inefficient and slow or overburdened and prone to failure under heavy load.

Security risks are another serious consequence of the inconsistent application of business logic across different layers of the system. Input validation is a common example of where these risks can manifest. In many applications, input validation is performed on the client side to provide immediate feedback to users and prevent them from submitting incorrect or harmful data. However, if the same validation rules are not enforced in the database, malicious users could bypass the client-side validation and submit dangerous input directly to the database. This can lead to a range of security vulnerabilities, such as SQL injection attacks, where an attacker can execute arbitrary SQL commands by targeting gaps in the input validation process. These types of attacks can compromise the integrity of the data, expose sensitive information, and even take control of the entire system. The lack of a centralized system for managing business logic increases the likelihood that such vulnerabilities will go unnoticed and unaddressed, making the system more susceptible to security breaches.

The inconsistencies between web development and database development can also lead to data integrity issues, which are among the most critical problems in enterprise systems. When different parts of the system enforce different rules or interpretations of the data, there is a significant risk that the data stored in the database will not accurately reflect the intended state of the application. This can result in corrupted or inconsistent data, which is difficult to detect and even harder to correct. Data integrity issues can have far-reaching consequences, affecting everything from the accuracy of reports and analytics to the reliability of customer-facing applications. In the worst-case scenario, data integrity problems can lead to financial losses, legal liabilities, and damage to the organization's reputation. Ensuring that all parts of the system apply business logic consistently is essential for maintaining data integrity, but this is difficult to achieve when the logic is scattered across different layers and managed by different teams.

Moreover, these inconsistencies can create a lack of transparency in how data is processed and managed within the system. With business logic spread across different layers and implemented in different ways, it becomes difficult for developers, administrators, and auditors to get a clear picture of how data flows through the system and what rules govern its processing. This lack of transparency can hinder efforts to optimize the system, as it is not always clear where improvements need to be made or where potential bottlenecks and errors might occur. It also makes it harder to ensure that the system is compliant with industry regulations and standards, which often require a clear and auditable trail of how data is handled. In a system where business logic is fragmented, producing such an audit trail can be a complex and error-prone process, further increasing the risk of non-compliance.

The fragmented nature of business logic across the web and database layers also poses a significant challenge for maintaining and updating the system over time. As business requirements evolve, new features are added, and existing ones are modified, it becomes increasingly difficult to ensure that all relevant parts of the system are updated consistently. This is particularly true in large, complex systems where the codebase is vast and the interactions between different parts of the system are not always well understood. If updates to the business logic are not applied uniformly across the web and database layers, the system can quickly become riddled with inconsistencies, leading to bugs, performance issues, and unexpected behavior. This not only makes the system harder to maintain but also reduces its overall reliability and robustness, as different parts of the application may behave differently depending on which version of the logic they are using.

The problem is further exacerbated by the fact that the tools and languages used by web and database developers are often not fully compatible. Web developers might use modern, high-level frameworks that abstract away much of the underlying complexity, while database developers might rely on traditional SQL-based tools that require a more detailed understanding of the data structures and the underlying database management system. This disparity in tools and languages can make it difficult for the two teams to collaborate effectively, as they are essentially working in different environments with different assumptions and constraints. This can lead to miscommunications and errors, as changes made in one layer may not be properly reflected in the other, resulting in a system that is out of sync and prone to failure.

Another critical issue related to the inconsistency between web development and database code is the difficulty of enforcing data governance and compliance with regulatory requirements. In many industries, there are strict rules governing how data must be processed, stored, and accessed, and organizations must be able to demonstrate that they are in compliance with these rules. However, when business logic is not centralized and is instead scattered across different layers of the system, it becomes much harder to ensure that all parts of the system are adhering to the necessary standards. This increases the risk of regulatory breaches, which can result in significant legal and financial costs, as well as damage to the organization's reputation. Ensuring compliance in such an environment requires a great deal of effort and coordination, and even then, there is no guarantee that all potential issues will be identified and addressed.

One of the most frustrating aspects of this problem is the impact it has on the user experience. End users expect the software they interact with to be reliable, consistent, and responsive, but when the underlying business logic is fragmented and inconsistently applied, they may encounter a range of issues that undermine their confidence in the system. For example, users might experience errors when trying to save data, see discrepancies in the information displayed on different parts of the application, or encounter slow performance when the system is under heavy load. These issues can lead to frustration, reduced productivity, and ultimately a loss of trust in the system. In customer-facing applications, such problems can also lead to a loss of business, as customers may choose to take their business elsewhere if they perceive the system to be unreliable or difficult to use.

The long-standing and unmet need addressed by this invention is the creation of a unified and centralized system for managing business logic in enterprise systems. For years, organizations have struggled with the challenges of maintaining consistent and reliable data processing across the web and database layers, leading to inefficiencies, errors, and security risks. Despite the critical importance of data integrity and performance, there has been a lack of effective systems that bridge the gap between web and database development, leaving developers to rely on ad-hoc methods that are prone to failure. This invention fulfills that need by providing a robust system that ensures all business logic is centrally managed and consistently applied, thereby eliminating the root causes of the many issues that have plagued enterprise systems for decades.

SUMMARY OF THE INVENTION

The disclosed inventions (collectively, "invention") comprise a comprehensive system designed to centralize and standardize the management of business logic across different layers of an enterprise software architecture. This system primarily targets the integration between the web application layer and the database layer, ensuring that data handling, business rules, and processing logic are consistently applied throughout the software lifecycle management process. The invention introduces a hierarchical structure within the database, where each layer of the hierarchy corresponds to a different aspect of the software management process, such as family, application, package, and distribution layers. These layers are designed to reflect the natural hierarchy of software components, from the broadest categorization, like a software family, down to the most granular level, such as individual distribution methods.

At the core of the invention is the concept of a directory system, which acts as an intermediary between the web application and the database. This directory system is responsible for determining the appropriate stored procedure to execute based on the parameters passed from the user interface. By centralizing this decision-making process, the system ensures that all interactions with the database are handled in a consistent and controlled manner. The directory system is implemented as a set of stored procedures that manage data operations such as selecting, inserting, and updating records. These stored procedures are standardized across the entire system, meaning that each table within the database has a corresponding set of procedures that are used to manipulate its data.

In the context of the invention, "stored procedures" play a critical role in managing and executing business logic and data operations within the database. Stored procedures can be predefined, reusable sets of SQL statements or the like that are stored and executed within the database management system as opposed to on web applications or front end applications. The stored procedures are used to perform a variety of operations, such as selecting, inserting, updating, and deleting data, and are designed to enforce consistent business rules and logic across all interactions with the database.

The invention utilizes stored procedures as the primary mechanism for interacting with the database, ensuring that all data operations are handled in a standardized and controlled manner. Each table in the database has corresponding stored procedures that are specifically designed to manage the data associated with that table. Typically, there are three core stored procedures for each table: one for selecting data (often referred to as a "SELECT" procedure), one for inserting new records (an "INSERT" procedure), and one for updating existing records (an "UPDATE" procedure). These stored procedures are carefully designed to handle all possible fields of the table, with optional parameters that allow for flexibility in how data is processed.

The use of stored procedures in this invention provides several key benefits:

a. Consistency in Business Logic: By centralizing the business logic within stored procedures, the system ensures that the same rules and validations are applied every time data is manipulated. This consistency reduces the risk of errors and ensures that data integrity is maintained across all operations.

b. Centralized Control: Stored procedures allow the system to centralize control over data operations. Instead of having business logic scattered across different layers of the application, such as in the web code and the database code, the invention "encapsulates this logic within the database itself." This makes it easier to manage and update the logic as needed, without the risk of inconsistencies between different parts of the system.

c. Efficiency and Performance: Stored procedures are executed directly within the database management system, which is optimized for handling large volumes of data efficiently. This reduces the amount of data that needs to be transmitted between the application and the database, improving overall system performance. Additionally, because stored procedures are compiled and stored in the database, they can be executed more quickly than ad-hoc SQL queries.

d. Security and Access Control: The invention uses stored procedures to enforce security measures, such as validating user input and restricting access to certain data. Because stored procedures are executed within the database, they can be configured to only allow specific users or roles to execute certain operations. This helps protect sensitive data and ensures that only authorized users can perform critical actions, such as updating records or inserting new data.

e. Error Handling and Logging: The invention's stored procedures are designed with robust error-handling mechanisms. If an error occurs during the execution of a stored procedure, such as a violation of a business rule or a data integrity constraint, the procedure can generate an error message and log the issue for further analysis. This helps maintain the stability and reliability of the system by ensuring that problems are quickly identified and addressed.

f. Scalability and Maintenance: Stored procedures make the system more scalable and easier to maintain. Because the logic is centralized within the database, changes to business rules or data structures can be made in one place and automatically applied across the entire system. This reduces the need for extensive code changes and testing in other parts of the application, making it easier to scale the system as new requirements emerge.

g. Reusability and Modularity: Stored procedures are modular by nature, meaning they can be reused across different parts of the application. For example, a stored procedure for selecting data from a particular table can be called by multiple parts of the application, depending on the needs of the user. This reusability reduces redundancy in the codebase and makes the system more efficient.

In summary, stored procedures are a fundamental component of the invention, serving as the backbone for all database interactions. They provide a standardized, efficient, and secure way to manage data operations, enforce business logic, and ensure consistency across the entire software lifecycle management process. By leveraging stored procedures, the invention achieves a high level of control, reliability, and scalability, making it well-suited for managing complex enterprise software environments.

Stated differently, the use of standardized stored procedures is a key feature of this invention. Each table in the database has three core stored procedures: one for selecting data, one for inserting new records, and one for updating existing records. These procedures are designed to be comprehensive, including all possible fields and allowing for optional parameters. This design ensures that the stored procedures can handle any data operation required by the application, without the need for developers to write new procedures for each specific use case. The stored procedures are also designed to enforce consistent business logic, such as validating input data and ensuring that certain business rules are followed before data is inserted or updated. This reduces the risk of errors and ensures that the data in the database remains consistent and accurate.

In the context of the invention, tables are fundamental components of the database structure that store and organize data related to various aspects of the software lifecycle management process. Each table represents a specific entity or category of information within the system, such as software applications, packages, distribution methods, or lifecycle events. The data within these tables is structured in rows and columns, where each row represents a single record, and each column represents a particular attribute or field of that entity. Sample uses and functionality for tables are as follows.

a. Data Organization and Storage: Tables are used to systematically organize and store data in a structured format. For example, there might be a table dedicated to storing information about software applications, with columns for the application name, version, manufacturer, and other relevant attributes. Another table might store details about software packages, including build numbers, deployment status, and associated distribution methods. By categorizing data into specific tables, the system ensures that information is stored in a logical and easily retrievable manner.

b. Relational Structure: The invention leverages the relational nature of database tables, where relationships between different types of data are defined through keys and indexes. For example, a software package table might be linked to a software application table through a foreign key that references the application ID. These relationships allow the system to efficiently manage and query related data across multiple tables. This relational structure is crucial for maintaining data integrity and enabling complex queries that retrieve and manipulate data from multiple tables simultaneously.

c. Hierarchical Organization: The invention organizes tables into a hierarchical structure that reflects the natural hierarchy of the software management process. For instance, the top layer might include tables related to software families, which are broad categories grouping together related applications. Beneath that layer, tables might exist for individual applications, each associated with one or more software packages, which are stored in a separate table. Finally, the distribution methods for these packages might be stored in another table. This hierarchical organization allows the system to manage data at different levels of granularity and ensures that related data is grouped and processed together in a coherent way.

d. Business Logic Enforcement: Tables in the invention are not just passive data containers; they work in conjunction with stored procedures to enforce business logic. The stored procedures associated with each table are designed to perform specific operations, such as selecting, inserting, or updating records. These procedures ensure that the data stored in each table adheres to the business rules and constraints defined by the organization. For example, a table storing software package information might have a stored procedure that validates the deployment status before allowing an update, ensuring that only valid transitions in the software lifecycle are permitted.

e. Data Integrity and Consistency: Tables play a key role in maintaining data integrity and consistency across the system. Each table is designed with constraints, such as primary keys, foreign keys, and unique indexes, that enforce the integrity of the data. For example, a primary key might be used to ensure that each record in a table is unique, while a foreign key might enforce a relationship between records in different tables. These constraints help prevent errors such as duplicate records or orphaned data, where a record in one table references a non-existent record in another table.

f. Query Optimization: The invention's use of tables is optimized for efficient querying and data retrieval. Indexes are often applied to key columns within the tables to speed up search operations, making it faster to retrieve specific records or to join data from multiple tables. The hierarchical and relational organization of the tables further supports efficient querying, as it allows for complex queries that can access and manipulate data across multiple related tables with minimal performance overhead.

g. Version Control and Lifecycle Tracking: Certain tables within the system are specifically designed to track the lifecycle and version history of software components. For example, a version control table might store records of each version of a software application, including details such as the release date, changes made, and associated packages. This allows the system to maintain a historical record of all software versions, which is essential for auditing, compliance, and rollback purposes.

h. Integration with Other Systems: The tables in the invention are structured in a way that facilitates integration with other enterprise systems. For example, tables might store data that is required by external deployment tools or reporting systems. The standardized structure of the tables, combined with the use of stored procedures, ensures that data can be easily accessed, manipulated, and shared with other systems in a consistent and reliable manner.

i. Scalability and Flexibility: The tables are designed to be scalable, accommodating the growth of data as the organization's software portfolio expands. New tables can be added to the hierarchy to support additional entities or relationships as needed, without disrupting the existing data structure. This flexibility allows the system to evolve and adapt to new requirements, such as the introduction of new software applications, distribution methods, or lifecycle stages.

j. Audit and Compliance: The invention's tables also support audit and compliance functions by maintaining detailed records of all data operations. For example, certain tables might include columns that track the user who made changes, the date and time of the change, and the nature of the operation. These audit trails are crucial for ensuring that the system complies with regulatory requirements and organizational policies, providing transparency and accountability for all data-related activities.

Examples of Specific Tables in the System include:

a. Software Application Table: Stores core information about each software application managed by the system, including the application name, version, manufacturer, and description. This table may be linked to other tables that store information about related software packages and distribution methods.

b. Software Package Table: Contains records for each software package, detailing the build number, deployment status, associated application, and other relevant attributes. This table might include foreign keys that link it to the software application table and the distribution method table.

c. Distribution Method Table: Manages information about the various methods used to distribute software packages, such as deployment scripts, network locations, or physical media. This table is crucial for tracking how and where software is delivered to end users.

In summary, tables in the context of the invention are structures within the database that organize, store, and manage data related to the software lifecycle management process. They work in tandem with stored procedures to enforce business logic, maintain data integrity, and support efficient data operations across the system. The careful design and organization of these tables are key to the system's ability to handle complex, scalable, and secure data management tasks in an enterprise environment.

Another important aspect of the invention is its hierarchical structure. The system is organized into multiple layers, with each layer corresponding to a different aspect of the software management process. The highest layer in this hierarchy is the family layer, which groups together software applications that share common characteristics, such as the same manufacturer. Below the family layer is the application layer, which is defined by the name and version of the software application. Each application can have multiple packages, and each package is defined by a specific build of the application. The lowest layer in the hierarchy is the distribution layer, which handles the various methods by which the software is distributed to users. This hierarchical structure allows the system to manage software components in a logical and organized manner, ensuring that all related data is stored and processed in a consistent way.

The invention also includes a robust system for managing the flow of data between the user interface and the database. When a user interacts with the web application, such as by submitting a request to deploy a software package, the application sends a set of parameters to the directory system. The directory system then uses these parameters to determine which stored procedure to execute. For example, if the user is requesting information about a specific software package, the directory system might execute the select stored procedure for the package table. If the user is submitting new data, such as a request to add a new software package to the system, the directory system would execute the insert stored procedure. This centralized control over data operations ensures that all interactions with the database are handled in a consistent and predictable manner.

The system also incorporates features to ensure data integrity and consistency. For example, the insert and update stored procedures are designed to include extensive validation logic, ensuring that all required fields are present and that the data meets the necessary business rules before it is written to the database. The system also includes error-handling mechanisms that detect and log any issues that occur during the execution of stored procedures, allowing developers to quickly identify and resolve problems. Additionally, the system supports optional parameters, allowing users to pass in only the data that is relevant to the operation they are performing. This flexibility makes the system more versatile and easier to use, while still maintaining strict control over data integrity.

A significant feature of the invention is its ability to handle complex data relationships within the software management process. For instance, in the context of software distribution, the system can manage multiple distribution methods for a single software package, each with its own unique attributes and lifecycle status. The system tracks these relationships and ensures that all related data is kept in sync, so that changes to one part of the system are automatically reflected in other related parts. This capability is particularly important in large organizations where software components are distributed and managed across many different environments and platforms.

The invention is also designed to be scalable, meaning it can be used to manage a wide range of software applications, from small, single-user programs to large, enterprise-level systems. The hierarchical structure and standardized stored procedures make it easy to add new software components to the system, as the same logic and procedures can be applied regardless of the size or complexity of the application. This scalability is further enhanced by the use of a directory system, which allows the system to handle a large number of requests simultaneously without sacrificing performance or reliability.

In addition to managing software components, the system also provides tools for tracking the lifecycle of these components. This includes features for monitoring the status of software packages, such as whether they are in development, ready for deployment, or retired. The system can also track the history of each software component, recording details such as when it was created, who created it, and what changes have been made to it over time. This historical data is valuable for auditing purposes, as it provides a complete record of how the software has been managed throughout its lifecycle.

The system also supports integration with other enterprise systems, allowing it to be used as part of a broader software management strategy. For example, the system can be integrated with deployment tools, which automate the process of installing software on user devices. This integration allows the system to provide a seamless workflow from the initial creation of a software package through to its deployment and ongoing management. The system's centralized control over business logic ensures that all parts of the software management process are aligned and working together, reducing the risk of errors and improving overall efficiency.

The invention also includes advanced reporting and analytics capabilities, which allow users to generate detailed reports on various aspects of the software management process. These reports can include information such as the current status of all software packages, the distribution methods being used, and any errors or issues that have been encountered. The system's ability to generate these reports is based on the centralized management of business logic and data, which ensures that all information is accurate and up-to-date. These reports are useful for decision-making and planning, as they provide insights into how the software is being used and where improvements might be needed.

Another key feature of the invention is its emphasis on security and compliance. The system is designed to enforce strict controls over who can access and modify data, ensuring that only authorized users can make changes. It also includes features for tracking and auditing all data operations, allowing organizations to demonstrate compliance with industry regulations and standards. The system's centralized control over business logic also reduces the risk of security vulnerabilities, as it ensures that all data is validated and processed in a consistent and secure manner.

The invention is also designed to be user-friendly, with a focus on making it easy for non-technical users to interact with the system. The web application provides a simple and intuitive interface that guides users through the process of managing software components. The system also includes help text and other support features to assist users in completing tasks, such as creating new software packages or updating existing ones. This ease of use is important for ensuring that the system can be adopted by a wide range of users within an organization, from technical staff to business managers.

In addition to its core features, the invention also provides flexibility for customization and extension. Organizations can tailor the system to meet their specific needs by adding new layers to the hierarchy, creating custom stored procedures, or integrating the system with other tools and platforms. This flexibility makes the system adaptable to a wide range of use cases, from managing a single software application to overseeing an entire portfolio of software products.

The invention also supports real-time data processing, allowing users to see the results of their actions immediately. For example, when a user submits a request to update a software package, the system processes the request in real-time and updates the relevant data in the database. This real-time processing ensures that the system remains responsive and that users have access to the most current information at all times. The system's ability to handle real-time data is a critical feature for organizations that need to manage large volumes of data quickly and accurately.

Furthermore, the system includes robust error handling and logging mechanisms, which are critical for maintaining system reliability and ensuring data integrity. Whenever an error occurs, whether it's a failure in executing a stored procedure or an issue with data validation, the system logs detailed information about the error, including the context in which it occurred and any relevant parameters. This logging capability not only aids in troubleshooting and resolving issues but also provides a historical record of system performance, which can be invaluable for continuous improvement efforts.

The system is also designed with scalability in mind, capable of managing both small-scale and large-scale software management operations. Its architecture supports a wide range of software types, from individual applications to complex suites with multiple interdependencies. This scalability ensures that the system can grow alongside an organization, accommodating new software, users, and processes without the need for significant redesign or reconfiguration. This scalability is further enhanced by the system's modular design, which allows different components to be added or upgraded as needed.

Finally, the invention is built with future-proofing in mind, incorporating design principles that allow for easy updates and enhancements. As technology evolves and new requirements emerge, the system can be adapted and expanded to incorporate new features, support new types of software, and integrate with emerging technologies. This forward-thinking design ensures that the system will remain relevant and useful for many years to come, providing a solid foundation for software management in a wide range of industries and applications.

Sample key aspects and core features of the invention are as follows:

a. Centralized Management of Business Logic: The invention centralizes business logic within the database layer, using a directory system to manage and execute all data operations. This ensures that all business rules and logic are consistently applied across the entire system, regardless of the point of interaction.

b. Hierarchical Data Structure: The invention organizes data management into a hierarchical structure with multiple layers, including family, application, package, and distribution layers. Each layer corresponds to a different aspect of the software management process, allowing for a logical and organized approach to data handling.

c. Standardized Stored Procedures: Core to the invention are standardized stored procedures for selecting, inserting, and updating data in the database. These procedures are designed to handle all fields of a table with optional parameters, ensuring that they are versatile enough to cover all potential data operations without requiring custom procedures for specific cases.

d. Directory System: The directory system is a crucial component that acts as an intermediary between the user interface and the database. It determines which stored procedure to execute based on the parameters passed from the UI, ensuring that data operations are handled consistently and accurately.

e. Data Integrity and Validation: The invention includes comprehensive validation logic within the stored procedures to ensure that data meets required business rules before being written to the database. This helps maintain data integrity and prevents the storage of incorrect or incomplete data.

f. Error Handling and Logging: The system features robust error handling mechanisms that log detailed information about any issues encountered during data operations. This logging capability aids in troubleshooting and ensures that developers can quickly identify and resolve problems.

g. Scalability: The invention is designed to be scalable, capable of managing a wide range of software applications from small, single-user programs to large, enterprise-level systems. The hierarchical structure and standardized procedures make it easy to add new software components and handle a large number of requests simultaneously.

h. Interoperability and Integration: The system is capable of integrating with other enterprise tools, such as deployment systems, allowing for a seamless workflow from software creation to deployment and ongoing management. This integration ensures that all parts of the software management process are aligned and functioning together efficiently.

i. Lifecycle Management: The invention tracks the entire lifecycle of software components, from creation through deployment to retirement. It records historical data and status changes, providing a comprehensive audit trail that is valuable for compliance and decision-making.

j. Security and Compliance: The invention enforces strict access controls and validation processes to ensure that only authorized users can modify data. It also includes features for tracking and auditing all data operations, helping organizations demonstrate compliance with industry regulations and standards.

k. User-Friendly Interface: The system is designed with a user-friendly web interface that makes it easy for non-technical users to interact with the system. It includes support features like help text and guided workflows to assist users in completing tasks accurately.

l. Customization and Flexibility: The system offers flexibility for customization, allowing organizations to tailor the hierarchy, stored procedures, and integrations to meet their specific needs. This adaptability makes the system suitable for a wide range of applications.

m. Real-Time Data Processing: The system supports real-time processing of data operations, ensuring that users see the results of their actions immediately. This capability is crucial for maintaining responsiveness and providing up-to-date information.

n. Error Handling and Logging: The invention includes robust error handling mechanisms, ensuring that any errors during data processing are logged with detailed information for troubleshooting and resolution.

The foregoing sample key and/or core aspects collectively form a robust, scalable, and secure system that enhances the management of software lifecycle processes by centralizing and standardizing business logic, ensuring consistency, and improving data integrity and security.

A summary of an exemplary process flow for the inventive system is designed to ensure that data management, business logic, and software lifecycle operations are handled in a consistent, efficient, and secure manner across different layers of an enterprise software architecture. Below is a detailed explanation of the process flow for the system:

a. User Interaction with the Web Application: The process begins when a user interacts with the web application interface. This could involve a variety of actions, such as submitting a request to deploy a software package, updating an existing software component, or querying information about a particular software application. The user interacts with the web interface, which is designed to be user-friendly, guiding the user through the necessary steps to complete their task. The web application collects all relevant input data from the user, which may include parameters such as software name, version, build details, and distribution method.

b. Parameter Transmission to the Directory System: Once the user submits their request through the web application, the input data is packaged into a set of parameters. These parameters are then transmitted to the directory system, which acts as an intermediary between the web application and the database. The directory system is responsible for interpreting the user's request and determining the appropriate course of action. This ensures that the correct business logic is applied and that the request is processed consistently according to the system's standardized procedures.

c. Directory System Decision-Making: Upon receiving the parameters from the web application, the directory system evaluates the request and determines which stored procedure(s) need to be executed to fulfill the user's request. The directory system utilizes a set of predefined rules and logic to map the incoming parameters to the appropriate stored procedures. For example, if the user is requesting to view details of a software package, the directory system will determine that a "select" stored procedure needs to be executed on the relevant table in the database. If the user is adding or updating a software package, the system will decide whether to call the "insert" or "update" stored procedure.

d. Execution of Stored Procedures: Once the directory system has identified the correct stored procedure, it passes the parameters to this stored procedure, which is then executed within the database. The stored procedures are standardized across the system, ensuring that all data operations follow a consistent pattern. For example, each stored procedure is designed to handle all relevant fields of a table, with optional parameters that allow the procedure to be flexible in terms of the data it processes. The stored procedures are responsible for interacting directly with the database, retrieving, inserting, or updating data as specified by the user's request.

e. Data Validation and Business Logic Enforcement: During the execution of the stored procedure, the system performs comprehensive data validation and applies the necessary business logic. For example, if a user is attempting to insert new data into the database, the stored procedure will validate that all required fields are present, that the data conforms to predefined business rules, and that no conflicts or duplicates exist. If any validation fails, the system generates an error, which is logged for further analysis. This step ensures that all data entering the database is accurate, consistent, and in compliance with the organization's business rules.

f. Error Handling and Logging: If an error occurs during the execution of a stored procedure—whether due to invalid data, a system malfunction, or other issues—the system's error-handling mechanisms are triggered. These mechanisms log detailed information about the error, including the specific parameters that were passed, the context in which the error occurred, and any relevant error messages. This information is stored in a log that can be reviewed by developers and administrators to diagnose and resolve the issue. The system's robust error-handling capabilities ensure that problems can be quickly identified and addressed, minimizing disruption to the overall process flow.

g. Return of Processed Data to the Directory System: Once the stored procedure has successfully executed and completed the requested data operation, the processed data (if applicable) is returned to the directory system. For instance, if the user requested information retrieval, the results of the select query are passed back to the directory system. The directory system then prepares this data for transmission back to the web application, ensuring that the information is formatted correctly and contains all the relevant details requested by the user.

h. Data Presentation to the User: The processed data is then sent back to the web application, where it is presented to the user in a clear and intuitive manner. For example, if the user requested to view details about a software package, the web application will display the retrieved information in a structured format, showing all relevant attributes such as software name, version, build, and distribution status. If the operation involved updating or inserting data, the user may receive a confirmation message indicating that the operation was successfully completed.

i. Lifecycle Tracking and Status Update: If the user's request involved a change in the software lifecycle—such as moving a software package from development to deployment—the system updates the relevant status indicators in the database. The lifecycle status of the software component is tracked and recorded, ensuring that all changes are documented and reflected accurately in the system. This step is critical for maintaining an up-to-date view of the software's status throughout its lifecycle, from creation to retirement.

j. Integration with Other Systems: For requests that involve actions beyond simple database operations, such as deploying software to user devices, the system integrates with other enterprise tools and systems. For example, once a software package is ready for deployment, the system might send a command to an automated deployment tool that handles the installation of the software on user devices. This integration ensures a seamless workflow, where the system orchestrates the entire process from software creation through deployment, leveraging various tools and platforms as needed.

k. Audit and Compliance Logging: Throughout the entire process, the system maintains a detailed audit trail of all operations performed. This includes logging user actions, data changes, errors encountered, and the specific stored procedures that were executed. The audit logs are essential for compliance with industry regulations and organizational standards, as they provide a complete record of how data has been handled and processed within the system. This information can be used for audits, security reviews, and performance monitoring.

l. Real-Time Monitoring and Feedback: The system also supports real-time monitoring of its operations, providing feedback to administrators and users about the status of their requests. For example, administrators can view dashboards that show the current load on the system, the status of pending requests, and any errors that have been logged. Users receive immediate feedback on their actions, such as confirmation that a software package has been successfully added or updated. This real-time feedback helps ensure that the system is responsive and that users are kept informed throughout the process.

m. Scalability and Load Management: The system is designed to handle a large number of concurrent requests, ensuring that it remains responsive even under heavy load. The use of a centralized directory system and standardized stored procedures allows the system to efficiently manage resources, distributing workload evenly across the database and processing layers. As the number of users and software components grows, the system can scale to meet increased demand, maintaining performance and reliability.

n. User Role and Access Control: At every stage of the process, the system enforces strict access controls based on user roles. Only authorized users can perform certain actions, such as modifying software packages or executing specific stored procedures. The system checks user permissions before processing any request, ensuring that users can only access the data and perform the operations for which they have been granted rights. This role-based access control is crucial for maintaining data security and ensuring compliance with organizational policies.

o. Customization and Configuration: The system allows for customization and configuration to meet the specific needs of different organizations. Administrators can define custom layers in the hierarchy, create additional stored procedures, and configure the directory system to handle specialized data operations. This flexibility ensures that the system can be adapted to a wide range of use cases, from managing small software projects to overseeing large enterprise software portfolios.

p. Regular Updates and Maintenance: The system is designed to be maintained and updated regularly, with provisions for applying patches, updates, and enhancements without disrupting ongoing operations. Administrators can deploy updates to the directory system, stored procedures, and other components as needed, ensuring that the system remains up-to-date with the latest business logic, security practices, and technological advancements.

q. Reporting and Analytics: After processing user requests and data operations, the system offers robust reporting and analytics capabilities. Users and administrators can generate reports on various aspects of software management, including the status of software packages, distribution methods, lifecycle events, and error logs. These reports are generated based on real-time data and can be customized to meet specific needs, providing valuable insights for decision-making and strategic planning.

r. Historical Data and Archiving: The system also includes functionality for managing historical data and archiving records. As software components move through different stages of their lifecycle, the system maintains a record of all changes, updates, and interactions. This historical data can be archived for long-term storage, ensuring that the organization has access to a complete history of its software management activities. Archived data can be retrieved as needed for audits, compliance checks, or other purposes.

s. Feedback Loop for Continuous Improvement: The system supports a feedback loop where administrators and users can provide input on the system's performance, usability, and effectiveness. This feedback is used to identify areas for improvement, guide future updates, and refine the system's features. Continuous monitoring and user feedback ensure that the system evolves to meet changing needs and remains aligned with organizational goals.

t. Final Confirmation and User Notification: At the end of the process flow, the system provides a final confirmation to the user, notifying them that their request has been successfully completed. Whether the user has retrieved data, updated a software package, or initiated a deployment, they receive a clear and concise confirmation that their action has been processed. This final step closes the loop on the user's interaction with the system, ensuring that all operations are completed to their satisfaction and that they are fully informed of the outcome.

The above sample process flow for the invention illustrates the comprehensive, integrated approach of the system, emphasizing its focus on consistency, security, scalability, and user-friendliness in managing enterprise software lifecycle processes.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a system for managing software lifecycle processes in an enterprise environment includes a web application interface configured to receive input data from a user. The input data includes parameters related to software applications, software packages, and distribution methods. The web application interface serves as the primary interaction point for the user to submit requests within the system and is further configured to validate user input for format, completeness, and compliance with predefined rules before transmitting the input data to the directory system. The system also includes a directory system configured to receive the validated input data from the web application interface.

The directory system is further configured to analyze the input data to determine, based on predefined mapping logic, one or more stored procedures to execute within a database.

The directory system acts as an intermediary between the web application interface and the database, ensuring the correct business logic is applied for each request and dynamically selects the most appropriate stored procedures based on the current state of the hierarchical data structure, adapting to changes in the system's configuration or data relationships.

The system further includes a set of stored procedures within the database, each stored procedure corresponding to a specific data operation, including selecting, inserting, and updating data within one or more tables in the database. The stored procedures are standardized to enforce business logic, data validation, and security rules, and all executable code for performing these data operations is contained within the database as part of the stored procedures, with no executable code residing in the front-end application. The system also includes a hierarchical data structure within the database, comprising a plurality of tables, each table storing records associated with a distinct aspect of the software lifecycle, including software families, applications, packages, and distribution methods.

Each table is linked through relational keys to maintain data integrity and consistency, allowing the system to manage complex data relationships. The hierarchical data structure is further configured to support multiple levels of data granularity, enabling detailed tracking of software components from high-level families down to individual distribution instances. Additionally, the system includes a database management system configured to execute the stored procedures identified by the directory system, wherein the execution of the stored procedures performs operations on the data stored within the hierarchical data structure. The database management system enforces constraints on the data to maintain data integrity and security, thereby ensuring reliable data management. The database management system further optimizes the execution of stored procedures through query optimization, indexing, and caching mechanisms, enhancing performance and scalability. The system also includes an error-handling module configured to detect and log errors during the execution of the stored procedures. The error-handling module stores detailed information about the errors in an error log for further analysis and provides mechanisms for troubleshooting and resolution, including automatic rollback of transactions, retry mechanisms, and escalation of critical errors to system administrators, ensuring system stability and data integrity. The system further includes a real-time monitoring module configured to track the status of data operations and provide feedback to the user through the web application interface.

The real-time monitoring module updates the user on the progress and outcome of their requests, providing immediate insights into the system's operations and is further configured to generate and display performance metrics, system load indicators, and operational alerts, enabling proactive management of system resources and early detection of potential issues. The system also includes an audit trail module configured to record a history of all data operations, including the user who performed the operation, the time and date of the operation, and the specific data modified. The audit trail module ensures compliance with regulatory and organizational standards by maintaining a comprehensive, tamper-evident record of all actions taken within the system.

The audit trail module is further configured to support customizable retention policies and secure archival of audit logs, ensuring that historical data remains accessible and verifiable over long periods. Finally, the system includes a reporting and analytics module configured to generate reports based on the data stored within the hierarchical data structure. The reports provide insights into the status of software applications, packages, and distribution methods, as well as historical trends and performance metrics. The reporting and analytics module is further configured to support interactive report generation, allowing users to drill down into specific data points, apply filters, and visualize data through charts and graphs, thereby enhancing the usability and impact of the generated reports.

In some arrangements, the system includes a directory system that is further configured to dynamically adjust the selection of stored procedures based on changes in the hierarchical data structure, ensuring that the most current and relevant procedures are executed for each data operation, thereby adapting to the evolving structure of the database.

In some arrangements, the system includes a hierarchical data structure that also includes an additional layer for tracking the version history of software applications, with each version being stored as a separate record within a version control table. The version control table is linked to the corresponding application and package records, thereby enabling detailed version tracking and management.

In some arrangements, the system includes a set of stored procedures that also includes procedures specifically designed to manage the version control table. These procedures include methods for adding new versions, updating existing versions, and retrieving historical version data, thereby ensuring comprehensive version management within the system.

In some arrangements, the system includes an error-handling module that is further configured to automatically trigger corrective actions based on the type of error detected, such as rolling back a transaction or notifying an administrator for manual intervention, thereby maintaining system stability and data integrity.

In some arrangements, the system includes an audit trail module that is further configured to generate compliance reports that summarize the history of data operations for a specified period, highlighting any deviations from standard operating procedures, thereby facilitating compliance with regulatory and organizational standards.

In some arrangements, the system includes a real-time monitoring module that is further configured to display visual indicators, such as progress bars or status alerts, within the web application interface, providing users with immediate feedback on the status of their requests, thereby enhancing user interaction and system transparency.

In some arrangements, the system includes a reporting and analytics module that is further configured to allow users to customize reports by selecting specific data fields, time periods, and filters, enabling detailed and tailored insights into software lifecycle management, thereby meeting the specific informational needs of users.

In some arrangements, the system includes a web application interface that also includes a role-based access control module. This module is configured to restrict access to certain data operations and reports based on the user's role within the organization, ensuring that only authorized personnel can perform critical actions, thereby enhancing data security.

In some arrangements, the system includes a directory system that is further configured to integrate with external deployment tools, enabling automated deployment of software packages based on the data managed within the system and ensuring consistency between the development and production environments, thereby streamlining the deployment process.

In some arrangements, the system includes a hierarchical data structure that is further configured to store metadata related to the distribution methods, including details such as network locations, deployment scripts, and physical media, facilitating comprehensive tracking and management of software distributions, thereby providing full visibility into the software distribution lifecycle.

In some arrangements, the system includes a database management system that also includes a scalability module. The scalability module is configured to dynamically allocate resources based on the volume of incoming requests, ensuring that the system remains responsive under varying load conditions, thereby maintaining performance and reliability.

In some arrangements, the system includes a reporting and analytics module that is further configured to integrate with machine learning algorithms, providing predictive analytics on software lifecycle trends and potential issues based on historical data, thereby enabling proactive decision-making.

In some arrangements, the system includes an error-handling module that also includes a diagnostic toolset. This toolset provides administrators with detailed analysis and suggestions for resolving complex errors that occur during data operations, thereby improving the efficiency of troubleshooting and maintenance.

In some arrangements, the system includes a real-time monitoring module that is further configured to trigger alerts and notifications through multiple channels, including email and SMS, in the event of critical system issues or significant changes in data status, thereby ensuring timely responses to potential problems.

In some arrangements, the system includes an audit trail module that is further configured to store audit logs in a secure, tamper-evident format, ensuring that the logs can be used as reliable evidence in compliance audits and legal proceedings, thereby enhancing the system's credibility and accountability.

In some arrangements, the system includes a directory system that also includes a configuration management module. This module allows administrators to define and update business rules, stored procedure mappings, and other system settings through a centralized interface, thereby providing flexibility and control over the system's operation.

In some arrangements, the system includes a web application interface that is further configured to provide an intuitive user experience, with interactive dashboards, guided workflows, and contextual help features that assist users in navigating the system and completing tasks efficiently, thereby enhancing usability and user satisfaction.

In some arrangements, a system for managing software lifecycle processes in an enterprise environment includes a web application interface configured to receive input data from a user. The input data includes parameters related to software applications, software packages, and distribution methods. The web application interface serves as the primary interaction point for the user to submit requests within the system and is further configured to validate user input for format, completeness, and compliance with predefined rules before transmitting the input data to the directory system. The web application interface is also configured to enforce multi-level user authentication, requiring users to verify their identity through two-factor authentication (2FA) before accessing the system. Additionally, the interface manages user roles and permissions, ensuring that users have access only to functionalities and data relevant to their role within the organization. The interface also allows users to schedule automated data operations, such as periodic updates or batch processing tasks, based on predefined criteria, thereby automating routine processes and reducing manual intervention.

The system also includes a directory system configured to receive the validated input data from the web application interface. The directory system analyzes the input data to determine, based on predefined mapping logic, one or more stored procedures to execute within a database. The directory system acts as an intermediary between the web application interface and the database, ensuring the correct business logic is applied for each request. It dynamically selects the most appropriate stored procedures based on the current state of the hierarchical data structure, adapting to changes in the system's configuration or data relationships. The directory system also logs all decisions related to the selection of stored procedures, including the rationale for selecting a specific procedure based on input data, thereby providing transparency and traceability in the decision-making process. Furthermore, the directory system supports conditional logic, allowing the selection of different stored procedures based on complex rules and conditions derived from the input data.

The system includes a set of stored procedures within the database, each corresponding to a specific data operation, including selecting, inserting, and updating data within one or more tables in the database. The stored procedures are standardized to enforce business logic, data validation, and security rules. They handle complex data relationships, perform multi-step transactions, and maintain data integrity by enforcing referential constraints, triggers, and cascading updates within the database. All executable code for performing these data operations is contained within the database as part of the stored procedures, with no executable code residing in the front-end application. The stored procedures also handle bulk data operations, allowing the system to process large volumes of data efficiently by batching insert, update, and delete operations within a single transaction. Additionally, the stored procedures support data encryption, ensuring that sensitive data is encrypted during both storage and transmission within the database. The stored procedures also anonymize sensitive user data where necessary to comply with privacy regulations.

The system also includes a hierarchical data structure within the database, comprising a plurality of tables, each table storing records associated with a distinct aspect of the software lifecycle, including software families, applications, packages, and distribution methods. Each table is linked through relational keys to maintain data integrity and consistency, allowing the system to manage complex data relationships. The hierarchical data structure supports multiple levels of data granularity, enabling detailed tracking of software components from high-level families down to individual distribution instances. The hierarchical data structure also supports partitioning of tables based on data attributes, such as date or region, enabling improved query performance and management of large datasets by distributing data across multiple partitions. Additionally, the hierarchical data structure includes temporal tables, which store historical versions of data and allow for querying past states of the database, thereby enabling detailed auditing, time-based analysis, and rollback capabilities.

The system includes a database management system configured to execute the stored procedures identified by the directory system. The execution of the stored procedures performs operations on the data stored within the hierarchical data structure. The database management system enforces constraints on the data to maintain data integrity and security, ensuring reliable data management. The database management system optimizes the execution of stored procedures through query optimization, indexing, and caching mechanisms, thereby enhancing performance and scalability. It also implements automatic failover and recovery mechanisms, ensuring that the system remains operational and data integrity is preserved in the event of hardware or software failures. Additionally, the database management system distributes data operations across multiple nodes in a clustered environment, thereby improving load balancing, fault tolerance, and overall system performance. The database management system also supports real-time data synchronization across multiple environments, ensuring consistency between development, staging, and production environments. Furthermore, the database management system includes features for automated system maintenance, such as automatic updates of stored procedures or database schema changes, applied without downtime.

The system includes an error-handling module configured to detect, log, and manage errors during the execution of the stored procedures. The error-handling module stores detailed information about the errors in an error log for further analysis. It categorizes errors by severity, with critical errors triggering immediate alerts to system administrators and minor errors logged for later review. The error-handling module provides mechanisms for troubleshooting and resolution, including automatic rollback of transactions, retry mechanisms, and escalation of critical errors to system administrators, ensuring system stability and data integrity. The error-handling module also generates automated corrective actions based on predefined recovery plans, such as reprocessing failed transactions or switching to backup systems, thereby minimizing downtime and data loss in case of errors.

The system includes a real-time monitoring module configured to track the status of data operations and provide feedback to the user through the web application interface. The real-time monitoring module updates the user on the progress and outcome of their requests, providing immediate insights into the system's operations. It generates and displays performance metrics, system load indicators, and operational alerts, enabling proactive management of system resources and early detection of potential issues. The real-time monitoring module also provides predictive alerts based on historical system performance data, identifying potential bottlenecks or resource constraints before they impact system operations. Furthermore, the real-time monitoring module integrates with third-party monitoring and alerting services, allowing administrators to receive notifications and system status updates through external platforms.

The system includes an audit trail module configured to record a history of all data operations, including the user who performed the operation, the time and date of the operation, the specific data modified, and the stored procedures executed. The audit trail module ensures compliance with regulatory and organizational standards by maintaining a comprehensive, tamper-evident record of all actions taken within the system. The audit trail module supports digital signatures for each recorded operation, ensuring the authenticity and integrity of the audit log entries. The audit trail module also supports customizable retention policies and secure archival of audit logs, ensuring that historical data remains accessible and verifiable over long periods. Additionally, the audit trail module maintains a separate, read-only archive of audit logs in a secure offsite location, ensuring the preservation of audit data even in the event of catastrophic system failure.

The system includes a reporting and analytics module configured to generate reports based on the data stored within the hierarchical data structure. The reports provide insights into the status of software applications, packages, and distribution methods, as well as historical trends and performance metrics. The reporting and analytics module supports interactive report generation, allowing users to drill down into specific data points, apply filters, and visualize data through charts and graphs, thereby enhancing the usability and impact of the generated reports. The reporting and analytics module also integrates with external business intelligence tools, enabling the export of data and reports to these tools for advanced analysis and visualization. Additionally, the reporting and analytics module performs multi-dimensional queries utilizing advanced techniques like OLAP (Online Analytical Processing) cubes, allowing for sophisticated data analysis.

In some arrangements, a process for managing software lifecycle processes in an enterprise environment includes receiving input data from a user via a web application interface. The input data includes parameters related to software applications, software packages, and distribution methods. The web application interface serves as the primary interaction point for the user to submit requests within the system and is further configured to validate user input for format, completeness, and compliance with predefined rules before transmitting the input data to the directory system. The process also involves transmitting the validated input data to a directory system, wherein the directory system analyzes the input data to determine, based on predefined mapping logic, one or more stored procedures to execute within a database. The directory system acts as an intermediary between the web application interface and the database, ensuring the correct business logic is applied for each request and dynamically selects the most appropriate stored procedures based on the current state of the hierarchical data structure. The directory system also logs decisions related to the selection of stored procedures, including the rationale for selecting a specific procedure based on input data, thereby providing transparency and traceability in the decision-making process. Additionally, the directory system supports conditional logic, allowing the selection of different stored procedures based on complex rules and conditions derived from the input data.

The process includes executing one or more stored procedures within the database based on the input data, wherein the stored procedures perform data operations including selecting, inserting, and updating data within one or more tables in the database. The stored procedures enforce business logic, data validation, and security rules. They handle complex data relationships, perform multi-step transactions, and maintain data integrity by enforcing referential constraints, triggers, and cascading updates within the database. All executable code for performing these data operations is contained within the database as part of the stored procedures, with no executable code residing in the front-end application. The stored procedures also handle bulk data operations, allowing the system to process large volumes of data efficiently by batching insert, update, and delete operations within a single transaction. Additionally, the stored procedures support data encryption, ensuring that sensitive data is encrypted during both storage and transmission within the database. The stored procedures also anonymize sensitive user data where necessary to comply with privacy regulations.

The process includes organizing the data within a hierarchical data structure in the database, the hierarchical data structure comprising a plurality of tables, each table storing records associated with a distinct aspect of the software lifecycle, including software families, applications, packages, and distribution methods. Each table is linked through relational keys to maintain data integrity and consistency, allowing the system to manage complex data relationships. The hierarchical data structure supports multiple levels of data granularity, enabling detailed tracking of software components from high-level families down to individual distribution instances. The hierarchical data structure also supports partitioning of tables based on data attributes, such as date or region, enabling improved query performance and management of large datasets by distributing data across multiple partitions. Additionally, the hierarchical data structure includes temporal tables, which store historical versions of data and allow for querying past states of the database, thereby enabling detailed auditing, time-based analysis, and rollback capabilities.

The process involves managing the execution of the stored procedures via a database management system, wherein the database management system enforces constraints on the data to maintain integrity and security. The database management system optimizes the execution of stored procedures through query optimization, indexing, and caching mechanisms, thereby enhancing performance and scalability. The database management system also implements automatic failover and recovery mechanisms, ensuring that the system remains operational and data integrity is preserved in the event of hardware or software failures. Additionally, the database management system distributes data operations across multiple nodes in a clustered environment, thereby improving load balancing, fault tolerance, and overall system performance. The database management system also supports real-time data synchronization across multiple environments, ensuring consistency between development, staging, and production environments. Furthermore, the database management system includes features for automated system maintenance, such as automatic updates of stored procedures or database schema changes, applied without downtime, ensuring that the system remains up-to-date with the latest business rules, security patches, and performance enhancements.

The process includes detecting and logging errors during the execution of stored procedures via an error-handling module. The error-handling module categorizes errors by severity, with critical errors triggering immediate alerts to system administrators and minor errors logged for later review. The error-handling module provides mechanisms for error resolution, including automatic rollback of transactions, retry mechanisms, and escalation to administrators. The error-handling module also generates automated corrective actions based on predefined recovery plans, such as reprocessing failed transactions or switching to backup systems, thereby minimizing downtime and data loss in case of errors.

The process includes tracking the status of data operations in real-time and providing feedback to the user via a real-time monitoring module. The real-time monitoring module updates the user on the progress and outcome of their requests, providing immediate insights into the system's operations. The real-time monitoring module generates and displays performance metrics, system load indicators, and operational alerts, enabling proactive management of system resources and early detection of potential issues. The real-time monitoring module also provides predictive alerts based on historical performance data to identify potential bottlenecks or resource constraints before they impact system operations. Furthermore, the real-time monitoring module integrates with third-party monitoring and alerting services, allowing administrators to receive notifications and system status updates through external platforms.

The process includes recording a history of all data operations via an audit trail module. The audit trail module ensures compliance with regulatory and organizational standards by maintaining a comprehensive, tamper-evident record of all actions taken within the system. The audit trail module supports digital signatures for each recorded operation, ensuring the authenticity and integrity of the audit log entries. The audit trail module also supports customizable retention policies and secure archival of audit logs, ensuring that historical data remains accessible and verifiable over long periods. Additionally, the audit trail module maintains a separate, read-only archive of audit logs in a secure offsite location, ensuring the preservation of audit data even in the event of catastrophic system failure.

The process includes generating reports based on the data stored within the hierarchical data structure via a reporting and analytics module. The reports provide insights into the status of software applications, packages, and distribution methods, as well as historical trends and performance metrics. The reporting and analytics module supports interactive report generation, allowing users to drill down into specific data points, apply filters, and visualize data through charts and graphs. The reporting and analytics module also integrates with external business intelligence tools, enabling the export of data and reports to these tools for advanced analysis and visualization. Additionally, the reporting and analytics module performs multi-dimensional queries utilizing advanced techniques like OLAP (Online Analytical Processing) cubes, allowing for sophisticated data analysis.

The process further includes performing automated system maintenance, including updates of stored procedures or database schema changes without downtime, ensuring that the system remains up-to-date, secure, and efficient.

The following description and claims, in conjunction with the drawings-all integral parts of this specification-will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 depicts a sample system architecture diagram, illustrating the key components of the system, including the Web Application Interface, Directory System, Real-Time Monitoring Module, Database Management System, Stored Procedures, Hierarchical Data Structure, Error-Handling Module, Audit Trail Module, Reporting and Analytics Module, and External Tools Integration.

FIG. 2 depicts a sample process flow diagram, showing the sequence of operations starting from user input via the Web Application Interface, through validation, data transmission to the Directory System, selection and execution of stored procedures (e.g., select, insert, update), error handling, real-time monitoring, report generation, and process completion.

FIG. 3 depicts a sample entity relationship diagram, showing the relationships between different entities within the system, including the Web Application Interface, Directory System, Stored Procedures, Hierarchical Data Structure, Database Management System, Error-Handling Module, Real-Time Monitoring Module, Audit Trail Module, and Reporting and Analytics Module.

FIG. 4 depicts a sample class diagram, detailing the classes involved in the system such as WebApplicationInterface, DirectorySystem, StoredProcedures (with subclasses SelectStoredProcedure, InsertStoredProcedure, and UpdateStoredProcedure), HierarchicalDataStructure (including tables like SoftwareFamilies, Applications, Packages, and DistributionMethods), DatabaseManagementSystem, ErrorHandlingModule, RealTimeMonitoringModule, AuditTrailModule, and ReportingAndAnalyticsModule.

FIG. 5 depicts a sample sequence diagram, illustrating the interactions between the user and system components during a typical operation, including the Web Application Interface, Directory System, Stored Procedures, Database Management System, Hierarchical Data Structure, Error Handling Module, Real-Time Monitoring Module, Audit Trail Module, and Reporting And Analytics Module.

FIG. 6 depicts a sample record hierarchy with common agnostic attributes and system specific attributes for a Family (e.g., app name and manufacturer), Application (e.g., app version), Package (e.g., build), and Distribution (e.g., lifecycle status).

DETAILED DESCRIPTION

The invention is a comprehensive system and process designed to manage software lifecycle processes within an enterprise environment. It ensures the consistent, secure, and efficient handling of software applications, packages, and distribution methods. At the core of the invention is a web application interface that serves as the primary point of interaction for users. This interface is configured to receive input data from users, including parameters related to software applications, software packages, and distribution methods. The interface is also equipped with advanced validation mechanisms to ensure that all user inputs meet predefined rules for format, completeness, and compliance before being processed further by the system.

To maintain high levels of security, the web application interface enforces multi-level user authentication, including two-factor authentication (2FA), ensuring that only authorized users can access the system. Additionally, the interface incorporates role-based access control, which restricts user access to specific data operations and reports based on their role within the organization. This ensures that sensitive operations are only performed by authorized personnel, thereby enhancing the overall security of the system.

Once validated, the input data is transmitted to a directory system, which plays a crucial role in processing the data.

The directory system analyzes the input data and, based on predefined mapping logic, determines the appropriate stored procedures to execute within the database. Acting as an intermediary between the web application interface and the database, the directory system ensures that the correct business logic is applied for each request. It dynamically selects stored procedures based on the current state of the hierarchical data structure, adapting to any changes in the system's configuration or data relationships.

The invention also includes a set of "stored procedures" within the database that are responsible for performing specific data operations, such as: (a) selecting, (b) inserting, and (c) updating data within the database tables. These stored procedures are designed to handle complex data relationships and maintain data integrity by enforcing business logic, data validation, and security rules. Importantly, all executable code for these operations resides within the database as part of the stored procedures, with no executable code in the front-end application. This separation enhances security and ensures that data operations are performed consistently within the database.

The system's hierarchical data structure is another key aspect of the invention. This structure organizes data into multiple tables, each representing a distinct aspect of the software lifecycle, including software families, applications, packages, and distribution methods. These tables are linked through relational keys, ensuring data integrity and consistency across the system. The hierarchical data structure supports multiple levels of data granularity, allowing for detailed tracking of software components from high-level software families down to individual distribution instances. The structure also supports data partitioning and temporal tracking, which improves query performance and enables detailed auditing and historical analysis.

To ensure the system operates efficiently and reliably, the invention includes a robust database management system. This system is responsible for executing the stored procedures identified by the directory system and managing the data within the hierarchical structure. The database management system enforces constraints on the data to maintain integrity and security, optimizes query execution through indexing and caching mechanisms, and implements automatic failover and recovery processes to maintain system availability during hardware or software failures. The system is also designed to distribute data operations across multiple nodes in a clustered environment, improving load balancing, fault tolerance, and overall system performance.

Error handling is another critical component of the invention. The system includes an error-handling module that detects, logs, and categorizes errors during the execution of stored procedures. This module is equipped with mechanisms to automatically resolve issues, such as rolling back transactions or retrying operations. For critical errors, the system triggers alerts and notifies administrators to ensure prompt resolution. This approach minimizes system downtime and ensures that data integrity is maintained even in the event of errors.

Real-time monitoring is integral to the system's operation, providing continuous feedback on the status of data operations. The real-time monitoring module tracks system performance, updates users on the progress of their requests, and generates alerts for potential issues before they impact system operations. This module also integrates with third-party monitoring tools, allowing for broader visibility and more comprehensive system oversight.

The system's audit trail module provides a detailed record of all data operations, including the user who performed each action, the time and date of the operation, and the specific data that was modified. This audit trail is tamper-evident and supports digital signatures to ensure the authenticity of the log entries. The module is designed to meet regulatory and organizational standards, offering customizable retention policies and secure archival to ensure that historical data remains accessible and verifiable over long periods.

For analysis and reporting, the invention includes a powerful reporting and analytics module. This module generates detailed reports based on the data stored within the hierarchical data structure, providing insights into the status of software applications, packages, and distribution methods. Users can customize reports by selecting specific data fields, time periods, and filters, and can visualize the data through interactive charts and graphs. The reporting module also supports integration with external business intelligence tools, enabling advanced data analysis and visualization.

The invention also addresses system scalability and maintenance. The database management system is equipped with features that allow it to dynamically allocate resources based on the volume of incoming requests, ensuring that the system remains responsive under varying load conditions. Additionally, the system supports automated maintenance tasks, including the application of security patches, updates to stored procedures, and schema changes, all of which can be performed without system downtime.

In terms of deployment, the system is designed to integrate with external tools that manage software deployment, ensuring consistency between the development, staging, and production environments. This integration streamlines the deployment process and ensures that software packages are deployed according to the configurations managed within the system.

The invention further includes capabilities for advanced analytics through the integration of machine learning algorithms. These algorithms provide predictive insights into software lifecycle trends and potential issues, enabling proactive decision-making and more efficient management of software processes.

Finally, the user experience is a key consideration in the design of the system. The web application interface is designed to be intuitive, with interactive dashboards, guided workflows, and contextual help features that assist users in navigating the system and completing tasks efficiently. This user-centered design approach enhances the usability and overall satisfaction of the system's users, ensuring that the system meets the needs of the enterprise environment in which it is deployed.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models-Megatron: A large, powerful transformer model designed for natural language processing tasks. (6) IBM AI Models-Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

FIG. 1 depicts a detailed system architecture diagram for managing software lifecycle processes within an enterprise environment, showcasing the intricate relationships between various key components.

At the start of this architecture is the Web Application Interface labeled as 100. This interface serves as the primary point of interaction between the user and the system, configured to receive input data related to software applications, packages, and distribution methods. It ensures that user inputs are validated for format, completeness, and adherence to predefined rules before being transmitted to the next critical component in the architecture, the Directory System labeled as 102. The Web Application Interface is further designed to enforce multi-level user authentication, such as two-factor authentication (2FA), ensuring that only authorized users can access the system. It also manages user roles and permissions, making sure that users only have access to the functionalities and data that are pertinent to their roles within the organization.

Once the data is validated and authorized through the Web Application Interface, it is transmitted to the Directory System (102). The Directory System plays a crucial role in analyzing the input data to determine the appropriate stored procedures to execute within the database. This system acts as an intermediary between the Web Application Interface and the Database Management System labeled as 106, ensuring that the correct business logic is applied for each user request. The Directory System dynamically selects the most appropriate stored procedures, labeled as 108, based on the current state of the Hierarchical Data Structure labeled as 110. This dynamic selection is crucial as it allows the system to adapt to any changes in the configuration or relationships within the data structure. Additionally, the Directory System logs all decisions related to the selection of stored procedures, including the rationale for each selection, providing transparency and traceability in the decision-making process.

The Database Management System (106) is the backbone of the architecture, responsible for managing the stored procedures and ensuring the integrity and security of data operations within the hierarchical structure. The Stored Procedures (108) within the database handle specific data operations, such as selecting, inserting, and updating data within the Hierarchical Data Structure (110). These procedures are standardized to enforce business logic, validate data, and apply security rules, ensuring that all executable code operates within the database, with no reliance on the front-end application. The Hierarchical Data Structure (110) itself is a complex framework that organizes data into multiple tables representing different aspects of the software lifecycle, including software families, applications, packages, and distribution methods. This structure is designed to maintain data integrity and consistency across the system by using relational keys to link the tables.

Supporting these core functions is the Error-Handling Module labeled as 112, which is responsible for detecting and logging any errors that occur during the execution of stored procedures. This module categorizes errors by severity and provides mechanisms for troubleshooting and resolution, including automatic rollback of transactions and escalation of critical errors to system administrators. It ensures system stability and data integrity by minimizing the impact of errors on the overall operation of the system. Additionally, the Real-Time Monitoring Module (104) tracks the status of data operations, providing immediate feedback to users through the Web Application Interface. This module generates and displays performance metrics, system load indicators, and operational alerts, enabling proactive management of system resources and early detection of potential issues.

The Audit Trail Module labeled as 114 records a comprehensive history of all data operations, including the user who performed the operation, the time and date, and the specific data modified. This module ensures compliance with regulatory and organizational standards by maintaining a tamper-evident record of all actions within the system. It supports customizable retention policies and secure archival of audit logs, ensuring that historical data remains accessible and verifiable over long periods. Lastly, the Reporting and Analytics Module labeled as 116 generates reports based on data within the Hierarchical Data Structure. These reports provide insights into the status of software applications, packages, and distribution methods, as well as historical trends and performance metrics. This module integrates with external business intelligence tools, enabling advanced analysis and visualization of data.

Additionally, the External Tools Integration labeled as 118 allows the system to interface with third-party tools for extended functionalities such as deployment, monitoring, or business intelligence. This integration ensures that the system remains flexible and scalable, capable of adapting to the evolving needs of the enterprise environment. Each component in this architecture works in concert to create a robust, secure, and efficient system for managing the entire lifecycle of software within an organization.

FIG. 2 illustrates the detailed process flow for managing software lifecycle processes within the system, beginning with the user input and ending with the completion of data operations, including potential error handling and reporting. The process starts with User Input via the Web Application Interface, labeled as 200, where the user submits data related to software applications, packages, and distribution methods. The system then proceeds to Validate Input Data at step 202, where the Web Application Interface checks the input for format, completeness, and adherence to predefined rules to ensure that only valid data is processed further. Once the data is validated, it is transmitted to the Directory System, as shown in step 204.

At step 206, the Directory System analyzes the input data to determine the appropriate stored procedure to execute within the database, based on predefined logic and the current state of the data structure. The system then proceeds to step 208, where it Selects the Appropriate Stored Procedure to carry out the required data operation, such as selecting, inserting, or updating data. The selected stored procedure is then executed in the database, as indicated by step 210. The system evaluates the success of the data operation at step 212, labeled Data Operation Success?. If the operation is successful, the system updates the Real-Time Monitoring Module at step 214, which tracks the progress and status of data operations, providing immediate feedback to the user.

In the event of an error during the execution of the stored procedure, the system logs the error in the Error-Handling Module at step 216, categorizing it by severity and determining whether to retry the operation or escalate the issue. If the system decides to retry the operation, it loops back to execute the stored procedure again; if not, it escalates the issue to the appropriate personnel or system administrators for manual intervention, as shown in step 220. Whether the operation is successful or if an error occurs, feedback is provided to the user via the Web Application Interface at step 218.

Subsequently, the system generates reports using the Reporting and Analytics Module at step 222, which provides insights into the status of software applications, packages, and distribution methods, as well as historical trends and performance metrics. These reports are based on the data processed and stored during the operation. The process also includes the Audit Trail Module at step 224, which records all operations, including the user who initiated them, the time and date, and the specific data modified. This ensures a comprehensive, tamper-evident record of all actions taken within the system.

Finally, the process either ends at step 226, labeled End Process, or integrates with external tools for extended functionalities such as deployment, monitoring, or business intelligence, as indicated by step 228. This comprehensive flow ensures that every aspect of the software lifecycle process is managed efficiently, with appropriate checks, validations, and feedback loops to maintain the integrity and performance of the system.

FIG. 3 presents the Entity Relationship Diagram (ERD) for the system, illustrating the relationships between various entities involved in managing software lifecycle processes within an enterprise environment. The Web Application Interface labeled as 300 serves as the entry point for user interactions, capturing input data, enforcing validation rules, managing user authentication, and handling user roles and scheduled operations. The Web Application Interface interacts directly with the Directory System labeled as 302, which is responsible for analyzing input data, selecting appropriate stored procedures, and logging decision-making processes. The Directory System acts as the intermediary, ensuring that business logic is properly applied by dynamically selecting and executing the relevant stored procedures based on predefined conditions.

The Stored Procedures entity, labeled as 304, is central to the system's data operations, containing the logic for handling complex transactions, validating data, enforcing security rules, and performing bulk operations. This entity has specialized sub-entities, including SelectStoredProcedure (306), InsertStoredProcedure (308), and UpdateStoredProcedure (310), each of which carries out specific data operations within the Hierarchical Data Structure (312). The Hierarchical Data Structure is composed of several related tables, including SoftwareFamilies (314), Applications (316), Packages (318), and DistributionMethods (320), each with its own primary and foreign keys to maintain relational integrity and manage the data granularity, partitioning, and temporal data required for comprehensive software lifecycle management.

The Database Management System labeled as 322 oversees the integrity and optimization of these operations, ensuring that the stored procedures execute efficiently, with mechanisms for query optimization, indexing, caching, load balancing, and real-time data synchronization across multiple environments. Additionally, the system incorporates an Error Handling Module (324), which logs and categorizes errors, providing troubleshooting mechanisms and corrective actions to ensure the system remains stable and reliable.

Further enhancing the system's functionality, the Real-Time Monitoring Module labeled as 326 tracks the status of ongoing operations, generating performance metrics, alerts, and predictive insights, which are then communicated back to the user interface. The Audit Trail Module (328) records a detailed history of all system operations, supporting compliance with regulatory standards through digital signatures, retention policies, and secure archival practices. Finally, the Reporting and Analytics Module (330) synthesizes the data stored in the hierarchical structure, generating interactive reports, visualizations, and integrating with external business intelligence tools to provide comprehensive insights and support strategic decision-making.

The relationships between these entities are clearly defined in the diagram, with directional connections indicating the flow of data and commands throughout the system. For instance, the Web Application Interface is connected to the Directory System with a relationship labeled "Validates and Transmits Data To," while the Directory System is linked to the Stored Procedures with a relationship labeled "Determines and Executes." The Stored Procedures interact with the Hierarchical Data Structure through operations like "Selects Data From," "Inserts Data Into," and "Updates Data In." The system's comprehensive architecture is designed to ensure that all aspects of the software lifecycle are managed efficiently, securely, and transparently, from user input to final reporting.

FIG. 4 illustrates a comprehensive class diagram that provides a detailed view of the various classes within the system architecture for managing software lifecycle processes, as well as the relationships between these classes. At the top of the hierarchy is the WebApplicationInterface class, labeled as 400, which serves as the main interface for user interaction. This class contains attributes such as 'Input-Data', 'ValidationRules', 'UserAuthentication', 'User-Roles', and 'ScheduledOperations'. The methods associated with this class include 'validateInput( )', 'authenticateUser( )', 'manageUserRoles( )', and 'scheduleOperations( )'. These methods and attributes define the functionality of the Web Application Interface, which is responsible for validating user input, managing authentication and roles, and scheduling operations within the system.

The DirectorySystem class, labeled as 402, is directly connected to the WebApplicationInterface. This class contains attributes such as 'InputDataAnalysis', 'Selected-StoredProcedure', 'DecisionLog', and 'ConditionalLogic', and it includes methods like 'analyzeInput( )', 'select-StoredProcedure( )', and 'logDecision( )'. The Directory System plays a critical role in analyzing the input data received from the Web Application Interface, selecting the appropriate stored procedures to execute within the database, and logging the decisions made during this process for traceability.

At the core of data operations within the system is the Stored Procedures class, labeled as 404, which is abstract and serves as the parent class for more specific stored procedure classes. It includes attributes like 'Business-Logic', 'DataValidation', 'SecurityRules', 'ComplexTransactions', 'BulkOperations', 'DataEncryption', and 'DataAnonymization'. The abstract class has a method called 'executeProcedure( )', which is implemented by its subclasses. The subclasses include SelectStoredProcedure (406), InsertStoredProcedure (408), and UpdateStoredProcedure (410), each of which has specific methods ('select-Data( )', 'insertData( )', and 'updateData( )' respectively) that execute the corresponding data operations within the system.

The Hierarchical Data Structure class, labeled as 412, represents the organization of data within the database. It contains attributes such as 'DataGranularity', 'Partitioning', and 'TemporalData', with methods 'manageData( )' and 'retrieveHistoricalData( )' that allow for the management of data at various levels of granularity, partitioning of tables, and retrieval of historical data. The Hierarchical Data Structure includes several related classes representing tables in the database, such as SoftwareFamilies (414), Applications (416), Packages (418), and DistributionMethods (420). Each of these classes has specific attributes like 'FamilyID', 'ApplicationID', 'PackageID', and 'DistributionID', and methods like 'manageSoftwareFamily( )', 'manageApplication( )', 'managePackage( )', and 'manageDistributionMethod( )', which handle the respective data operations within their domains.

The Database Management System class, labeled as 422, manages the execution of stored procedures and ensures the integrity and performance of the system. It includes attributes such as 'DataIntegrity', 'QueryOptimization', 'IndexingAndCaching', 'FailoverMechanisms', 'LoadBalancing', 'RealTimeSynchronization', and 'AutomatedMaintenance'. The methods in this class, including 'executeCommands( )', 'optimizeQueries( )', and 'manageFailover( )', ensure that data operations are executed efficiently and reliably, with mechanisms in place to handle failures and optimize performance.

Supporting the stability and reliability of the system is the ErrorHandlingModule class, labeled as 424, which logs and categorizes errors, and includes methods like 'logError( )', 'categorizeError( )', and 'executeCorrectiveActions( )'. This class is critical for maintaining system stability by addressing errors that occur during data operations. The RealTime-MonitoringModule class, labeled as 426, tracks the status of ongoing operations and provides feedback to users. It includes attributes such as 'StatusUpdates', 'Performance-Metrics', 'OperationalAlerts', and 'PredictiveAlerts', and methods like 'trackStatus( )', 'generateAlerts( )', and 'provideFeedback( )'.

The Audit Trail Module class, labeled as 428, records all operations within the system for compliance and auditing purposes. It includes attributes such as 'OperationLog', 'DigitalSignatures', 'RetentionPolicies', and 'Off-siteArchive', and methods like 'recordOperation( )', 'applySignature( )', and 'archiveLogs( )'. This class ensures that all actions within the system are logged and can be verified. Finally, the Reporting and Analytics Module class, labeled as 430, is responsible for generating reports and visualizing data. It includes attributes like 'ReportGeneration', 'InteractiveReports', 'DataVisualization', and 'ExternalIntegration', with methods 'generateReport( )', 'visualizeData( )', and 'integrateWithBI( )' that enable the creation of comprehensive reports and integration with external business intelligence tools.

The diagram visually represents the relationships between these classes, with inheritance lines connecting the abstract Stored Procedures class to its subclasses, and association lines indicating how each class interacts with others. This class diagram provides a detailed overview of how the different components of the system work together to manage software lifecycle processes, ensuring data integrity, security, and efficiency throughout the enterprise environment.

FIG. 5 presents a detailed sequence diagram that outlines the step-by-step interactions between the various components of the system during a typical software lifecycle operation. The process begins with the User, labeled as 500, initiating a request through the Web Application Interface labeled as 502. This interface is responsible for validating the user input to ensure it meets the necessary format, completeness, and compliance standards. Following this, the Web Application Interface authenticates the user, as shown in step 504, using multi-level authentication processes, including two-factor authentication (2FA).

Once the user is authenticated, they can schedule an operation, such as a periodic update or batch processing task, through the Web Application Interface, as indicated by step 506. The validated and authenticated data is then transmitted to the Directory System, labeled as 508. The Directory System analyzes the input data at step 510 to determine the appropriate stored procedure to execute within the database. Based on this analysis, the Directory System selects the relevant stored procedure, such as Insert-StoredProcedure, SelectStoredProcedure, or UpdateS-toredProcedure, at step 512.

After selecting the stored procedure, the Directory System logs the decision-making process, including the rationale for the selection, at step 514 to ensure traceability and transparency. The stored procedure is then executed within the system, as depicted by step 516. This execution involves performing the specific data operation, whether it be selecting, inserting, or updating data within the Hierarchical Data Structure, labeled as 518. The Database Management System ensures that these operations are conducted efficiently and securely.

The Error Handling Module, labeled as 520, continuously monitors the operation to check for success or failure. If an error occurs, the module logs the error, categorizes its severity, and decides whether to retry the operation or escalate the issue for manual intervention. If the operation is successful, the Real-Time Monitoring Module updates the status of the operation and provides real-time feedback to the user via the Web Application Interface, as shown in step 522.

In parallel, the Audit Trail Module, labeled as 524, records all aspects of the operation, including the user who initiated it, the time, date, and the specific data that was modified.

This ensures a tamper-evident, comprehensive record for auditing and compliance purposes. After the operation is completed, the Reporting and Analytics Module, labeled as 526, generates reports based on the data processed and the outcomes of the operation. Finally, the User receives feedback through the Web Application Interface at step 528, concluding the sequence of interactions.

This sequence diagram effectively captures the complex interactions between the user and the various system components, illustrating how data flows through the system and how each module contributes to managing software lifecycle processes efficiently, securely, and transparently.

For reference, FIG. 6 depicts a sample record hierarchy with common agnostic attributes and system specific attributes for a Family (e.g., app name and manufacturer), Application (e.g., app version), Package (e.g., build), and Distribution (e.g., lifecycle status).

Each Family 600 can contain common application agnostic attributes including unique application names that identify manufactures, application ID numbers, etc. Applications 602A-602N can include common package agnostic attributes, including unique application version numbers, application identifiers, etc. Packages 604A-604N can include comment distribution agnostic attributes, including build numbers, build identifiers, etc. Distributions 606A-606N can include distribution system attributes, such as, for example, lifecycle status tracking information and distribution identifiers.

Pseudocode sample implementations of various aspects of the invention can be understood from the following that incorporates the database tables and the three types of stored procedures (i.e., SELECT, INSERT, UPDATE) specific to managing software lifecycle processes within the system. This pseudocode illustrates how data is organized in the database tables, how stored procedures operate on these tables, and how they interact with other system components.

```
// System Initialization
Initialize WebApplicationInterface
Initialize DirectorySystem
Initialize DatabaseManagementSystem
Initialize ErrorHandlingModule
Initialize RealTimeMonitoringModule
Initialize AuditTrailModule
Initialize ReportingAndAnalyticsModule
// Define Database Tables
Table SoftwareFamilies {
    Column FamilyID INT PRIMARY KEY,
    Column FamilyName VARCHAR(255),
    Column Description TEXT
}
Table Applications {
    Column ApplicationID INT PRIMARY KEY,
    Column FamilyID INT FOREIGN KEY REFERENCES SoftwareFamilies(FamilyID),
    Column ApplicationName VARCHAR(255),
    Column Version VARCHAR(50),
    Column Description TEXT
}
Table Packages {
    Column PackageID INT PRIMARY KEY,
    Column ApplicationID INT FOREIGN KEY REFERENCES Applications(ApplicationID),
    Column PackageName VARCHAR(255),
    Column BuildNumber VARCHAR(50),
    Column DeploymentStatus VARCHAR(50)
}
Table DistributionMethods {
    Column DistributionID INT PRIMARY KEY,
    Column PackageID INT FOREIGN KEY REFERENCES Packages(PackageID),
    Column MethodName VARCHAR(255),
```

```
    Column NetworkLocation VARCHAR(255),
    Column DeploymentScript TEXT
}
Table ErrorLogs {
    Column ErrorID INT PRIMARY KEY,
    Column ErrorMessage TEXT,
    Column Severity VARCHAR(50),
    Column Timestamp DATETIME,
    Column UserID INT
}
Table AuditLogs {
    Column LogID INT PRIMARY KEY,
    Column ActionType VARCHAR(50),
    Column UserID INT,
    Column Timestamp DATETIME,
    Column Details TEXT,
    Column DigitalSignature VARCHAR(255)
}
// Stored Procedures for SELECT, INSERT, UPDATE
// SELECT Stored Procedure Example
Procedure SelectSoftwareFamily(FamilyID INT) {
    Return ExecuteSQL("SELECT * FROM SoftwareFamilies WHERE FamilyID = ?",
FamilyID)
}
Procedure SelectApplication(ApplicationID INT) {
    Return ExecuteSQL("SELECT * FROM Applications WHERE ApplicationID = ?",
ApplicationID)
}
Procedure SelectPackage(PackageID INT) {
    Return ExecuteSQL("SELECT * FROM Packages WHERE PackageID = ?", PackageID)
}
Procedure SelectDistributionMethod(DistributionID INT) {
    Return ExecuteSQL("SELECT * FROM DistributionMethods WHERE DistributionID =
?", DistributionID)
}
// INSERT Stored Procedure Example
Procedure InsertSoftwareFamily(FamilyName VARCHAR(255), Description TEXT) {
    ExecuteSQL("INSERT INTO SoftwareFamilies (FamilyName, Description) VALUES (?,
?)", FamilyName, Description)
}
Procedure InsertApplication(FamilyID INT, ApplicationName VARCHAR(255), Version
VARCHAR(50), Description TEXT) {
    ExecuteSQL("INSERT INTO Applications (FamilyID, ApplicationName, Version,
Description) VALUES (?, ?, ?, ?)", FamilyID, ApplicationName, Version, Description)
}
Procedure InsertPackage(ApplicationID INT, Package Name VARCHAR(255),
BuildNumber VARCHAR(50), DeploymentStatus VARCHAR(50)) {
    ExecuteSQL("INSERT INTO Packages (ApplicationID, PackageName, BuildNumber,
DeploymentStatus) VALUES (?, ?, ?, ?)", ApplicationID, PackageName, BuildNumber,
DeploymentStatus)
}
Procedure InsertDistributionMethod(PackageID INT, MethodName VARCHAR(255),
NetworkLocation VARCHAR(255), DeploymentScript TEXT) {
    ExecuteSQL("INSERT INTO DistributionMethods (PackageID, MethodName,
NetworkLocation, DeploymentScript) VALUES (?, ?, ?, ?)", PackageID, MethodName,
NetworkLocation, DeploymentScript)
}
// UPDATE Stored Procedure Example
Procedure UpdateSoftwareFamily(FamilyID INT, FamilyName VARCHAR(255),
Description TEXT) {
    ExecuteSQL("UPDATE SoftwareFamilies SET FamilyName = ?, Description = ?
WHERE FamilyID = ?", FamilyName, Description, FamilyID)
}
Procedure UpdateApplication(ApplicationID INT, ApplicationName VARCHAR(255),
Version VARCHAR(50), Description TEXT) {
    ExecuteSQL("UPDATE Applications SET ApplicationName = ?, Version = ?,
Description = ? WHERE ApplicationID = ?", ApplicationName, Version, Description,
ApplicationID)
}
Procedure UpdatePackage(PackageID INT, PackageName VARCHAR(255),
BuildNumber VARCHAR(50), DeploymentStatus VARCHAR(50)) {
    ExecuteSQL("UPDATE Packages SET PackageName = ?, BuildNumber = ?,
DeploymentStatus = ? WHERE PackageID = ?", PackageName, BuildNumber,
DeploymentStatus, PackageID)
}
Procedure UpdateDistributionMethod(DistributionID INT, MethodName
VARCHAR(255), NetworkLocation VARCHAR(255), DeploymentScript TEXT) {
    ExecuteSQL("UPDATE DistributionMethods SET MethodName = ?,
NetworkLocation = ?, DeploymentScript = ? WHERE DistributionID = ?", MethodName,
```

-continued

```
NetworkLocation, DeploymentScript, DistributionID)
}
// User Login Process
Function UserLogin(username, password) {
   Validate(username, password)
   If AuthenticationSuccess Then
      PromptFor2FA( )
      If 2FASuccess Then
         GrantAccess(UserRole)
      Else
         DenyAccess( )
      EndIf
   Else
      DenyAccess( )
   EndIf
}
// User Input Process
Function ReceiveUserInput(UserInput) {
   ValidatedData = WebApplicationInterface.ValidateInput(UserInput)
   If ValidatedData.IsValid Then
      DirectorySystem.ProcessInput(ValidatedData)
   Else
      ErrorHandlingModule.LogError("Invalid Data", ValidatedData)
   EndIf
}
// Directory System Processing
Function DirectorySystem.ProcessInput(ValidatedData) {
   // Determine which stored procedure to execute
   StoredProcedure = MapInputToProcedure(ValidatedData)
   // Execute the selected stored procedure in the database
   ExecuteStoredProcedure(StoredProcedure, ValidatedData)
}
// Execute Stored Procedure
Function ExecuteStoredProcedure(StoredProcedure, ValidatedData) {
   Try {
   Result        =        DatabaseManagementSystem.Execute(StoredProcedure,
ValidatedData)
      RealTimeMonitoringModule.Update(Result)
      AuditTrailModule. RecordAction("StoredProcedureExecuted",        User,
StoredProcedure, Result)
   } Catch (Exception e) {
      ErrorHandlingModule.HandleError(e, StoredProcedure)
   EndIf
}
// Error Handling
Function ErrorHandlingModule.HandleError(Exception e, StoredProcedure) {
   LogError(e)
   If e.Severity == Critical Then
      TriggerAlert(e)
      RollbackTransaction( )
      NotifyAdmin(e)
   Else
      RetryOperation(StoredProcedure)
   EndIf
}
// Real-Time Monitoring
Function RealTimeMonitoringModule. Update(Result) {
   MonitorSystemPerformance( )
   If PerformanceIssuesDetected Then
      PredictAndAlertPotentialIssues( )
   EndIf
}
// Audit Trail Logging
Function AuditTrailModule.RecordAction(ActionType, User, StoredProcedure, Result)
{
   Timestamp = GetCurrentTime( )
   DigitalSignature = GenerateDigitalSignature(ActionType, User, StoredProcedure,
Timestamp)
   StoreAuditLog(ActionType, User, StoredProcedure, Result, Timestamp,
DigitalSignature)
}
// Generate Reports
Function GenerateReport(ReportType, Filters) {
   Data = QueryDatabaseForReport(ReportType, Filters)
   VisualizedData = ReportingAndAnalyticsModule.Visualize(Data)
   Return VisualizedData
}
// System Maintenance
Function PerformSystemMaintenance( ) {
```

```
      ScheduleAutomatedUpdates( )
      BackupSystem Data( )
      ApplySecurityPatches( )
      MonitorSystemHealth( )
   }
// Supporting Functions
Function MapInputToProcedure(ValidatedData) {
      // Determine the appropriate stored procedure based on the validated input
      Return ProcedureMapping[ValidatedData.Type]
   }
Function MonitorSystemPerformance( ) {
      // Monitor key performance indicators like CPU, Memory, Disk Usage, etc.
      UpdateDashboard( )
   }
Function StoreAuditLog(ActionType, User, StoredProcedure, Result, Timestamp,
DigitalSignature) {
      // Securely store the audit log entry with all relevant details
      AuditLogDatabase.Store(ActionType, User, StoredProcedure, Result, Timestamp,
DigitalSignature)
   }
Function PredictAndAlertPotentialIssues( ) {
      // Use historical data to predict and alert about potential performance issues
      SendAlertToAdmin("Potential System Bottleneck Detected")
   }
Function RetryOperation(StoredProcedure) {
      // Attempt to re-execute the stored procedure
      Try {
         Result = DatabaseManagementSystem.Execute(StoredProcedure)
         RealTimeMonitoringModule.Update(Result)
      } Catch (Exception e) {
         ErrorHandlingModule.HandleError(e, StoredProcedure)
      }
   }
Function RollbackTransaction( ) {
      // Rollback the current database transaction to maintain data integrity
      DatabaseManagementSystem.Rollback( )
   }
Function TriggerAlert(Exception e) {
      // Trigger an alert to the system administrator or monitoring system
      SendAlert("Critical Error Occurred: " + e.Message)
   }
Function BackupSystemData( ) {
      // Perform system data backup to ensure recoverability
      BackupModule.PerformBackup( )
   }
Function ApplySecurityPatches( ) {
      // Apply any pending security patches to the system
      SecurityModule.ApplyPatches( )
   }
Function ScheduleAutomatedUpdates( ) {
      // Schedule automated updates and maintenance tasks
      MaintenanceScheduler.Schedule("Nightly", "SystemUpdate")
   }
Function GenerateDigitalSignature(ActionType, User, StoredProcedure, Timestamp) {
      // Generate a digital signature for the audit log entry
      Return DigitalSignatureModule.Generate(ActionType, User, StoredProcedure,
Timestamp)
   }
```

The foregoing pseudocode examples outlines the operation of a comprehensive system designed to manage software lifecycle processes in an enterprise environment. The system is built around key components such as user interfaces, stored procedures, error handling, real-time monitoring, audit logging, and reporting. Below is a detailed explanation of each part of the pseudocode and how it contributes to the overall functionality of the system.

a. System Initialization-Initialize Components: The system initialization phase is crucial as it sets up the various components required for the system to function. This includes:

i. WebApplicationInterface: Handles interactions with the user, including input validation and user authentication.

ii. DirectorySystem: Processes validated input data, maps it to the appropriate stored procedure, and ensures correct data operations.

iii. DatabaseManagementSystem: Manages all data operations in the database, including the execution of stored procedures.

iv. ErrorHandlingModule: Monitors and responds to errors that occur during data processing.

v. RealTimeMonitoringModule: Continuously monitors system performance and user activities.

vi. AuditTrailModule: Logs all significant actions for compliance and security purposes.

vii. ReportingAndAnalyticsModule: Generates reports and provides analytical insights based on the data.

b. Database Tables: The database tables are the core structures where all data is stored and managed. Each table has a specific purpose within the system:

i. SoftwareFamilies: Stores information about different software families, each identified by a unique FamilyID. This table helps categorize and manage software at a high level.

ii. Applications: Contains details about individual software applications, linked to their respective software families through FamilyID. It includes application-specific details like ApplicationName, Version, and Description.

iii. Packages: Manages records of software packages associated with specific applications. It includes details such as PackageName, BuildNumber, and DeploymentStatus, which are crucial for tracking the software's deployment state.

iv. DistributionMethods: Stores information about the methods used to distribute software packages. This includes deployment scripts and network locations, which are essential for the distribution process.

v. ErrorLogs: Logs any errors encountered during the system's operation, including details like the error message, severity, timestamp, and the user associated with the error.

vi. AuditLogs: Maintains a secure and verifiable record of all significant actions performed within the system, including the action type, user, timestamp, and digital signature for authenticity.

c. Stored Procedures: Stored procedures can be precompiled SQL operations that perform specific data-related tasks in the database. They ensure consistent application of business logic and data processing rules.

i. SELECT Procedures: Retrieve data from the database based on specific criteria. For example, SelectSoftwareFamily (FamilyID) retrieves all records related to a particular software family.

ii. INSERT Procedures: Add new records to the database. For example, InsertSoftwareFamily (FamilyName, Description) inserts a new software family into the SoftwareFamilies table.

iii. UPDATE Procedures: Modify existing records in the database. For instance, UpdateSoftwareFamily (FamilyID, FamilyName, Description) updates the details of an existing software family.

d. User Login Process—UserLogin: This function handles user authentication, including validating the username and password, and if successful, prompts for multifactor authentication (2FA). If both steps succeed, the user is granted access based on their role; otherwise, access is denied.

e. User Input Process—ReceiveUserInput: This function receives and validates user input through the web application interface. If the data is valid, it is processed by f. Directory System Processing—ProcessInput: The directory system takes the validated data and determines the appropriate stored procedure to execute. This ensures that the correct business logic is applied based on the current state of the database and the nature of the input data.

g. Execute Stored Procedure—ExecuteStoredProcedure: This function executes the selected stored procedure in the database. It handles data operations and ensures that any resulting data is updated in real-time and logged in the audit trail. If an error occurs during execution, it is managed by the error handling module.

h. Error Handling—HandleError: This function logs errors and categorizes them by severity. Critical errors trigger alerts, rollbacks, and notifications to administrators, while less severe errors may simply be retried.

i. Real-Time Monitoring—RealTimeMonitoringModule: Continuously tracks system performance and updates relevant dashboards. It also provides predictive alerts based on historical performance data to identify potential issues before they escalate.

j. Audit Trail Logging—RecordAction: Logs significant actions within the system, including the details of the operation, the user who performed it, and a digital signature to ensure the authenticity of the log entry.

k. Generate Reports—GenerateReport: Allows users to generate reports based on specific criteria, filters, and data visualizations. These reports are critical for analyzing system performance, user activity, and other key metrics.

l. System Maintenance—PerformSystemMaintenance: Automates tasks such as system updates, backups, and security patch applications. This function ensures that the system remains up-to-date, secure, and performant.

m. Supporting Functions: These functions support the core operations of the system by mapping input to procedures, monitoring system performance, storing audit logs, and managing other critical tasks like system backups and error handling retries.

The follow describes the overall workflow of the pseudocode examples.

a. User Interaction: The system begins with user interaction via the web application interface. Users log in, and their inputs are validated and authenticated.

b. Data Processing: Validated data is passed to the directory system, which maps the data to the appropriate stored procedure. This procedure is executed in the database, affecting the relevant tables.

c. Error Handling and Monitoring: Throughout this process, any errors are logged and managed, while the system's performance is continuously monitored in real-time.

d. Audit Logging: Every significant action is recorded in the audit trail, ensuring that there is a complete history of operations for compliance and security.

e. Reporting and Maintenance: Users can generate detailed reports on system operations, and automated maintenance ensures that the system remains secure and reliable.

This pseudocode outlines a robust, secure, and scalable system for managing software lifecycle processes, incorporating best practices for data management, error handling, real-time monitoring, and compliance through audit logging. Each component works in tandem to ensure that the system operates efficiently and securely, while also being adaptable to the evolving needs of an enterprise environment.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Alternative embodiments, improvements, and modifications to the disclosed system for managing software lifecycle processes in an enterprise environment can be implemented to enhance functionality, efficiency, and adaptability to various use cases, all within the spirit and scope of the disclosure. For example, the Web Application Interface could be enhanced with machine learning algorithms to predict user inputs based on historical data, thereby improving user experience by pre-populating fields or suggesting likely values. Additionally, the system could integrate more advanced biometric authentication methods, such as facial recognition or fingerprint scanning, in place of or alongside two-factor authentication (2FA) to further enhance security.

In terms of the Directory System, one possible modification could involve incorporating a more sophisticated decision engine that utilizes artificial intelligence (AI) to analyze input data and select stored procedures. This AI-powered engine could dynamically adapt to changing business logic or data relationships without requiring manual updates, thereby improving the system's flexibility and reducing maintenance overhead. Furthermore, the Stored Procedures could be optimized to handle even larger datasets through the use of parallel processing techniques, which would significantly reduce execution time and improve overall system performance.

The Hierarchical Data Structure might also be expanded to include additional tables and relationships, allowing for more granular tracking of software components or the integration of new data types, such as unstructured data from logs or IoT devices. This would make the system more versatile and capable of managing a broader range of software lifecycle activities. Moreover, the Database Management System could be modified to support multi-cloud environments, allowing data operations to be distributed across multiple cloud providers, which would enhance redundancy, scalability, and fault tolerance.

Improvements to the Error Handling Module could include the implementation of predictive error analysis tools that identify potential issues before they occur, based on patterns observed in historical error logs. This proactive approach would further minimize downtime and improve system reliability. Additionally, the Real-Time Monitoring Module could be enhanced with advanced visualization tools, such as interactive dashboards or augmented reality interfaces, to provide administrators with more intuitive and actionable insights into system performance.

The Audit Trail Module could be modified to integrate with blockchain technology, ensuring that all logs are immutable and further enhancing the system's security and compliance capabilities. Lastly, the Reporting and Analytics Module could be improved by incorporating advanced data analytics techniques, such as predictive modeling or natural language processing, to provide more insightful and actionable reports that support strategic decision-making.

All of these alternative embodiments, improvements, and modifications are within the spirit and scope of the disclosed systems and processes, as they align with the overall objective of providing a robust, secure, and efficient solution for managing software lifecycle processes. The flexibility of the system's architecture allows for these enhancements to be integrated seamlessly, ensuring that the system remains adaptable to evolving technological trends and organizational needs.

The invention claimed is:

1. A system for managing software lifecycle processes in an enterprise environment, the system comprising one or more processors and memory storing instructions that, when executed by the one or more processors, cause the system to perform the following:

a web application interface configured to receive input data from a user, wherein the input data includes parameters related to software applications, software packages, and distribution methods, and wherein the web application interface serves as the primary interaction point for the user to submit requests within the system, the web application interface further configured to validate user input for format, completeness, and compliance with predefined rules before transmitting the input data to a directory system, thereby reducing a likelihood of errors and ensuring that only valid data is processed by the system;

a directory system configured to receive validated input data from the web application interface, the directory system further configured to analyze the input data to determine, based on predefined mapping logic, one or more stored procedures to execute within a database, wherein the directory system acts as an intermediary between the web application interface and the database, ensuring correct business logic is applied for each request, and wherein the directory system dynamically selects the most appropriate stored procedures based on a current state of a hierarchical data structure, adapting to changes in the system's configuration or data relationships;

a set of stored procedures within the database, each stored procedure corresponding to a specific data operation, including selecting, inserting, and updating data within one or more tables in the database, wherein the stored procedures are standardized to enforce business logic, data validation, and security rules, and wherein all executable code for performing these data operations is contained within the database as part of the stored procedures, with no executable code residing in a front-end application, the stored procedures further configured to handle complex data relationships, perform multi-step transactions, and maintain data integrity by enforcing referential constraints, triggers, and cascading updates within the database;

a hierarchical data structure within the database, the hierarchical data structure comprising a plurality of tables, each table storing records associated with a distinct aspect of the software lifecycle, including software families, applications, packages, and distribution methods, wherein each table is linked through relational keys to maintain data integrity and consistency, allowing the system to manage complex data relationships, the hierarchical data structure further configured to support multiple levels of data granularity, enabling detailed tracking of software components from high-level families down to individual distribution instances;

a database management system configured to execute the stored procedures identified by the directory system, wherein the execution of the stored procedures performs operations on the data stored within the hierarchical data structure, and wherein the database management system enforces constraints on the data to maintain data integrity and security, the database management system further configured to optimize the execution of stored procedures through query optimization, indexing, and caching mechanisms, thereby enhancing the performance and scalability of data operations:

an error-handling module configured to detect, log, and manage errors during the execution of the stored procedures, wherein the error-handling module stores detailed information about the errors in an error log for further analysis, and wherein the error-handling module provides mechanisms for troubleshooting and resolution, including automatic rollback of transactions, retry mechanisms, and escalation of critical errors to system administrators, thereby ensuring system stability and data integrity;

a real-time monitoring module configured to track status of data operations and provide feedback to the user through the web application interface, wherein the real-time monitoring module updates the user on progress and outcome of their requests, providing immediate insights into system operations, the real-time monitoring module further configured to generate and display performance metrics, system load indicators, and operational alerts, enabling proactive management of system resources and early detection of potential issues;

an audit trail module configured to record a history of all data operations, including the user who performed the operation, the time and date of the operation, the specific data modified, and the stored procedures executed, wherein the audit trail module ensures compliance with regulatory and organizational standards by maintaining a comprehensive, tamper-evident record of all actions taken within the system, the audit trail module further configured to support customizable retention policies and secure archival of audit logs, ensuring that historical data remains accessible and verifiable over long periods; and a reporting and analytics module configured to generate reports based on the data stored within the hierarchical data structure, wherein the reports provide insights into the status of software applications, packages, and distribution methods, as well as historical trends and performance metrics, enabling informed decision-making and strategic planning, the reporting and analytics module further configured to support interactive report generation, allowing users to drill down into specific data points, apply filters, and visualize data through charts and graphs, thereby enhancing usability and impact of the generated reports, the reporting and analytics module further configured to perform multi-dimensional queries utilizing advanced techniques like OLAP (Online Analytical Processing) cubes for sophisticated data analysis, wherein the reporting and analytics module is further configured to integrate with external business intelligence (BI) tools, enabling export of data and reports to these tools for advanced analysis and visualization, thereby extending system analytical capabilities.

2. The system of claim 1, wherein the web application interface is further configured to enforce multi-level user authentication, requiring users to verify their identity through two-factor authentication (2FA) before accessing the system, thereby enhancing security and preventing unauthorized access to the system's functionalities.

3. The system of claim 2, wherein the directory system is further configured to log all decisions related to the selection of stored procedures, including rationale for selecting a specific procedure based on input data, thereby providing transparency and traceability in a decision-making process.

4. The system of claim 3, wherein the set of stored procedures includes procedures specifically designed for handling bulk data operations, allowing the system to process large volumes of data efficiently by batching insert, update, and delete operations within a single transaction, thereby improving system performance and reducing processing time.

5. The system of claim 4, wherein the hierarchical data structure is further configured to support partitioning of tables based on data attributes, such as date or region, enabling improved query performance and management of large datasets by distributing data across multiple partitions.

6. The system of claim 5, wherein the database management system is further configured to implement automatic failover and recovery mechanisms, ensuring that the system remains operational and data integrity is preserved in case of hardware or software failures, thereby increasing system reliability and availability.

7. The system of claim 6, wherein the error-handling module is further configured to categorize errors by severity, with critical errors triggering immediate alerts to system administrators and minor errors logged for later review, thereby prioritizing response efforts and ensuring timely resolution of critical issues.

8. The system of claim 7, wherein the real-time monitoring module is further configured to provide predictive alerts based on historical system performance data, identifying potential bottlenecks or resource constraints before they impact system operations, thereby enabling proactive management and optimization.

9. The system of claim 8, wherein the audit trail module is further configured to support digital signatures for each recorded operation, ensuring the authenticity and integrity of audit log entries, thereby providing legally admissible evidence of data operations and compliance.

10. The system of claim 9, wherein the reporting and analytics module is further configured to integrate with external business intelligence (BI) tools, enabling export of data and reports to these tools for advanced analysis and visualization, thereby extending system analytical capabilities.

11. The system of claim 10, wherein the web application interface is further configured to allow users to schedule automated data operations, such as periodic updates or batch processing tasks, based on predefined criteria, thereby automating routine processes and reducing manual intervention.

12. The system of claim 11, wherein the directory system is further configured to support conditional logic, allowing it to select different stored procedures based on complex rules and conditions derived from the input data, thereby increasing flexibility and adaptability of the system's operation.

13. The system of claim 12, wherein the set of stored procedures is further configured to support data encryption, ensuring that sensitive data is encrypted during both storage and transmission within the database, thereby enhancing data security and compliance with privacy regulations.

14. The system of claim 13, wherein the hierarchical data structure is further configured to include temporal tables, which store historical versions of data and allow for querying past states of the database, thereby enabling detailed auditing, time-based analysis, and rollback capabilities.

15. The system of claim 14, wherein the database management system is further configured to distribute data operations across multiple nodes in a clustered environment, thereby improving load balancing, fault tolerance, and overall system performance.

16. The system of claim 15, wherein the error-handling module is further configured to generate automated corrective actions based on predefined recovery plans, such as reprocessing failed transactions or switching to backup systems, thereby minimizing downtime and data loss in case of errors.

17. The system of claim 16, wherein the real-time monitoring module is further configured to integrate with third-party monitoring and alerting services, allowing administrators to receive notifications and system status updates through external platforms, thereby extending reach of monitoring capabilities.

18. The system of claim 17, wherein the audit trail module is further configured to maintain a separate, read-only archive of audit logs in a secure offsite location, ensuring the preservation of audit data even in the event of catastrophic system failure, thereby providing an additional layer of security and compliance.

19. A system for managing software lifecycle processes in an enterprise environment, the system comprising one or more processors and memory storing instructions that, when executed by the one or more processors, cause the system to perform the following:

a web application interface configured to receive input data from a user, wherein the input data includes parameters related to software applications, software packages, and distribution methods, and wherein the web application interface serves as the primary interaction point for the user to submit requests within the system, the web application interface further configured to:

validate user input for format, completeness, and compliance with predefined rules before transmitting the input data to a directory system;

enforce multi-level user authentication, requiring users to verify their identity through two-factor authentication (2FA) before accessing the system;

manage user roles and permissions, ensuring that users have access only to functionalities and data relevant to their role within an organization;

allow users to schedule automated data operations, such as periodic updates or batch processing tasks, based on predefined criteria, thereby automating routine processes and reducing manual intervention;

a directory system configured to receive validated input data from the web application interface, the directory system further configured to:

analyze the input data to determine, based on predefined mapping logic, one or more stored procedures to execute within a database;

act as an intermediary between the web application interface and the database, ensuring correct business logic is applied for each request;

dynamically select the most appropriate stored procedures based on a current state of a hierarchical data structure, adapting to changes in the system's configuration or data relationships;

log all decisions related to the selection of stored procedures, including rationale for selecting a specific procedure based on input data, thereby providing transparency and traceability in a decision-making process;

support conditional logic, allowing the selection of different stored procedures based on complex rules and conditions derived from the input data;

a set of stored procedures within the database, each procedure corresponding to a specific data operation, including selecting, inserting, and updating data within one or more tables in the database, wherein the stored procedures are standardized to:

enforce business logic, data validation, and security rules;

handle complex data relationships, perform multi-step transactions, and maintain data integrity by enforcing referential constraints, triggers, and cascading updates within the database;

execute all data operations within the database, with no executable code residing in a front-end application;

handle bulk data operations, allowing the system to process large volumes of data efficiently by batching insert, update, and delete operations within a single transaction;

support data encryption, ensuring that sensitive data is encrypted during both storage and transmission within the database;

anonymize sensitive user data where necessary to comply with privacy regulations;

a hierarchical data structure within the database, the hierarchical data structure comprising a plurality of tables, each table storing records associated with a distinct aspect of the software lifecycle, including software families, applications, packages, and distribution methods, wherein each table is linked through relational keys to maintain data integrity and consistency, the hierarchical data structure further configured to:

support multiple levels of data granularity, enabling detailed tracking of software components from high-level families down to individual distribution instances;

support partitioning of tables based on data attributes, such as date or region, enabling improved query performance and management of large datasets by distributing data across multiple partitions;

include temporal tables, which store historical versions of data and allow for querying past states of the database, thereby enabling detailed auditing, time-based analysis, and rollback capabilities;

a database management system configured to execute the stored procedures identified by the directory system, wherein the execution of the stored procedures performs operations on the data stored within the hierarchical data structure, and wherein the database management system:

enforces constraints on the data to maintain data integrity and security;

optimizes the execution of stored procedures through query optimization, indexing, and caching mechanisms, thereby enhancing the performance and scalability of data operations;

implements automatic failover and recovery mechanisms, ensuring that the system remains operational and data integrity is preserved in case of hardware or software failures;

distributes data operations across multiple nodes in a clustered environment, thereby improving load balancing, fault tolerance, and overall system performance;

supports real-time data synchronization across multiple environments, ensuring consistency between development, staging, and production environments;

includes automated system maintenance features, such as automatic updates of stored procedures or database schema changes, applied without downtime;

an error-handling module configured to detect, log, and manage errors during the execution of the stored procedures, wherein the error-handling module:

stores detailed information about the errors in an error log for further analysis;

categorizes errors by severity, with critical errors triggering immediate alerts to system administrators and minor errors logged for later review;

provides mechanisms for troubleshooting and resolution, including automatic rollback of transactions, retry mechanisms, and escalation of critical errors to system administrators;

generates automated corrective actions based on predefined recovery plans, such as reprocessing failed transactions or switching to backup systems, thereby minimizing downtime and data loss in case of errors;

a real-time monitoring module configured to track status of data operations and provide feedback to the user through the web application interface, wherein the real-time monitoring module:

updates the user on progress and outcome of their requests, providing immediate insights into the system's operations;

generates and displays performance metrics, system load indicators, and operational alerts, enabling proactive management of system resources and early detection of potential issues;

provides predictive alerts based on historical system performance data, identifying potential bottlenecks or resource constraints before they impact system operations;

integrates with third-party monitoring and alerting services, allowing administrators to receive notifications and system status updates through external platforms;

an audit trail module configured to record a history of all data operations, including the user who performed the operation, the time and date of the operation, the specific data modified, and the stored procedures executed, wherein the audit trail module:

ensures compliance with regulatory and organizational standards by maintaining a comprehensive, tamper-evident record of all actions taken within the system;

supports digital signatures for each recorded operation, ensuring the authenticity and integrity of audit log entries;

supports customizable retention policies and secure archival of audit logs, ensuring that historical data remains accessible and verifiable over long periods;

maintains a separate, read-only archive of audit logs in a secure offsite location, ensuring the preservation of audit data even in case of catastrophic system failure;

a reporting and analytics module configured to generate reports based on the data stored within the hierarchical data structure, wherein the reports provide insights into the status of software applications, packages, and distribution methods, as well as historical trends and performance metrics, enabling informed decision-making and strategic planning, the reporting and analytics module further configured to:

support interactive report generation, allowing users to drill down into specific data points, apply filters, and visualize data through charts and graphs;

integrate with external business intelligence (BI) tools, enabling export of data and reports to these tools for advanced analysis and visualization; and perform multi-dimensional queries utilizing advanced techniques like OLAP (Online Analytical Processing) cubes, allowing for sophisticated data analysis;

implements automatic failover and recovery mechanisms to ensure system operation and data integrity during hardware or software failures;

distributes data operations across multiple nodes in a clustered environment to improve load balancing and fault tolerance;

synchronizes data in real-time across multiple environments to ensure consistency;

detecting and logging errors during the execution of stored procedures via an error-handling module, wherein the error-handling module:

categorizes errors by severity and triggers immediate alerts for critical errors;

provides mechanisms for error resolution, including automatic rollback of transactions, retry mechanisms, and escalation to administrators;

generates automated corrective actions based on predefined recovery plans to minimize downtime and data loss;

tracking the status of data operations in real-time and providing feedback to the user via a real-time monitoring module, wherein the real-time monitoring module:

updates the user on the progress and outcome of their requests;

generates and displays performance metrics, system load indicators, and operational alerts;

provides predictive alerts based on historical performance data to identify potential bottlenecks or resource constraints;

integrates with third-party monitoring and alerting services for extended reach;

recording a history of all data operations via an audit trail module, wherein the audit trail module:

maintains a comprehensive, tamper-evident record of all actions taken within the system;

supports digital signatures for recorded operations to ensure authenticity and integrity;

supports customizable retention policies and secure archival of audit logs;

maintains a separate, read-only archive of audit logs in a secure offsite location;

generating reports based on the data stored within the hierarchical data structure via a reporting and analytics module, wherein the reporting and analytics module:

provides insights into the status of software applications, packages, and distribution methods, as well as historical trends and performance metrics;

supports interactive report generation with drill-down capabilities, filters, and data visualization;

integrates with external business intelligence (BI) tools for advanced analysis and visualization;

performs multi-dimensional queries utilizing advanced techniques like OLAP (Online Analytical Processing) cubes for sophisticated data analysis; and performing automated system maintenance, including updates of stored procedures or database schema changes, without downtime, ensuring that the system remains up-to-date with the latest business rules, security patches, and performance enhancements.

* * * * *